US012684235B2

(12) United States Patent
Kawai et al.

(10) Patent No.: US 12,684,235 B2
(45) Date of Patent: Jul. 14, 2026

(54) INFORMATION PROCESSING DEVICE, INFORMATION PROCESSING METHOD, AND PROGRAM

(71) Applicant: Sony Group Corporation, Tokyo (JP)

(72) Inventors: Takashi Kawai, Tokyo (JP); Seiichi Inomata, Tokyo (JP); Kazuyuki Takao, Kanagawa (JP); Fumito Watanabe, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 27 days.

(21) Appl. No.: 18/859,718

(22) PCT Filed: May 26, 2023

(86) PCT No.: PCT/JP2023/019673
§ 371 (c)(1),
(2) Date: Oct. 24, 2024

(87) PCT Pub. No.: WO2023/234204
PCT Pub. Date: Dec. 7, 2023

(65) Prior Publication Data
US 2025/0260897 A1     Aug. 14, 2025

(30) Foreign Application Priority Data
Jun. 3, 2022     (JP) ................................. 2022-091161

(51) Int. Cl.
*H04N 23/67*      (2023.01)
*H04N 23/60*      (2023.01)
(Continued)

(52) U.S. Cl.
CPC ........... *H04N 23/675* (2023.01); *H04N 23/60* (2023.01); *H04N 23/663* (2023.01);
(Continued)

(58) Field of Classification Search
CPC .... H04N 23/60; H04N 23/663; H04N 23/675; H04N 23/6812; H04N 23/687; H04N 23/69; H04N 23/80
See application file for complete search history.

(56) References Cited

U.S. PATENT DOCUMENTS 6,650,365 B1 * 11/2003 Sato ......................... H04N 1/40
348/231.3
9,041,853 B2 * 5/2015 Takegawa ............ H04N 5/2628
348/345
(Continued)

FOREIGN PATENT DOCUMENTS

JP      2008042405 A      2/2008
JP      2019208168 A      12/2019
(Continued)

OTHER PUBLICATIONS

International Search Report (PCT/ISA/210), International Application No. PCT/JP2023/019673, dated Aug. 22, 2023.

*Primary Examiner* — Lin Ye
*Assistant Examiner* — Chriss S Yoder, III
(74) *Attorney, Agent, or Firm* — Michael Best & Friedrich LLP

(57) ABSTRACT
An information processing device includes an acquisition unit that acquires meta-information regarding breathing correction associated with a moving image, and a breathing correction unit that performs breathing correction for the moving image on the basis of the meta-information.

32 Claims, 24 Drawing Sheets

(51) Int. Cl.

| | |
|---|---|
| *H04N 23/663* | (2023.01) |
| *H04N 23/68* | (2023.01) |
| *H04N 23/69* | (2023.01) |
| *H04N 23/80* | (2023.01) |

(52) U.S. Cl.
CPC .......... *H04N 23/687* (2023.01); *H04N 23/69* (2023.01); *H04N 23/80* (2023.01); *H04N 23/6812* (2023.01)

(56) References Cited

U.S. PATENT DOCUMENTS

| | | | |
|---|---|---|---|
| 2006/0227221 A1* | 10/2006 | Okubo ................... | H04N 23/68 |
| | | | 348/E5.046 |
| 2009/0066799 A1* | 3/2009 | Whitcombe ........... | H04N 23/68 |
| | | | 348/208.5 |
| 2019/0149739 A1* | 5/2019 | Sugita ................. | H04N 9/8205 |
| | | | 348/240.99 |
| 2020/0036902 A1* | 1/2020 | Sugitani ................. | H04N 23/80 |
| 2022/0108541 A1* | 4/2022 | Ozone ................. | H04N 23/683 |

FOREIGN PATENT DOCUMENTS

| | | |
|---|---|---|
| JP | 2020022012 A | 2/2020 |
| WO | 2020170604 A1 | 8/2020 |

\* cited by examiner

*FIG. 3*

ZOOM LENS
MOVABLE RANGE

FOCUS LENS
MOVABLE RANGE

OBJECT DISTANCE

IN-FOCUS DISTANCE

POSITION IN FOCUS
= IN-FOCUS POSITION
(IN-FOCUS POSITION)

OBJECT POSITION

OBJECT DISTANCE

FOCAL
LENGTH

| ZOOM LENS POSITION | INFINITY | IN-FOCUS POSITION | | | CLOSEST DISTANCE |
|---|---|---|---|---|---|
| | Fc[0]inf | Fc[1] | Fc[2] | ⋮ | Fc[x]mod |
| zm_[0] | Ratio_00 | Ratio_10 | Ratio_20 | ⋮ | Ratio_x0 |
| zm_[1] | Ratio_01 | Ratio_11 | Ratio_21 | ⋮ | Ratio_x1 |
| ⋮ | ⋮ | ⋮ | ⋮ | | ⋮ |
| zm_[y] | Ratio_0y | Ratio_1y | Ratio_2y | ⋮ | Ratio_xy |

BREATHING CORRECTION AMOUNT

BREATHING CORRECTION AMOUNT TABLE

| ZOOM LENS POSITION | INFINITY Fc[0]inf | Fc[1] | IN-FOCUS POSITION Fc[2] | : | : | CLOSEST DISTANCE Fc[x]mod |
|---|---|---|---|---|---|---|
| zm_[0] | fc_00 | fc_10 | fc_20 | : | : | fc_x0 |
| zm_[1] | fc_01 | fc_11 | fc_21 | | : | fc_x1 |
| : | : | : | : | | | : |
| zm_[y] | fc_0y | fc_1y | fc_2y | : | : | fc_xy |

FOCUS LENS POSITION

CAM CURVE TABLE

| ZOOM LENS POSITION | IN-FOCUS POSITION | | | | | |
|---|---|---|---|---|---|---|
| | INFINITY | | | | | CLOSEST DISTANCE |
| | Fc[0]inf | Fc[1] | Fc[2] | : | : | Fc[x]mod |
| WIDE ANGLE  zm_[0] | fl_00 | fl_10 | fl_20 | : | : | fl_x0 |
| zm_[1] | fl_01 | fl_11 | fl_21 | | | fl_x1 |
| : | : | : | : | : | : | : |
| TELEPHOTO  zm_[y] | fl_0y | fl_1y | fl_2y | : | : | fl_xy |

FOCAL LENGTH (ANGLE OF VIEW)

FOCAL LENGTH TABLE IN CONSIDERATION OF BREATHING

*FIG. 11*

| META-INFORMATION TYPE | CLIP META-INFORMATION | FRAME META-INFORMATION | | PREDETERMINED SAMPLING INTERVAL |
|---|---|---|---|---|
| | | EVERY FRAME | AT TIME OF CHANGE | |
| TABLE INFORMATION | O | | △ | |
| BREATHING CORRECTION AMOUNT MINIMUM VALUE MAXIMUM VALUE INFORMATION | O | | | |
| FOCAL LENGTH INFORMATION | | O | | |
| INTERNAL BREATHING CORRECTION PRESENCE/ABSENCE INFORMATION | O | △ | △ | |
| INTERNAL BREATHING CORRECTION AMOUNT INFORMATION | | O | | |
| BREATHING CORRECTION AMOUNT INFORMATION | | O | | |
| OPTICAL BREATHING CORRECTION INFORMATION | △ | O | | |
| LENS POSITION INFORMATION | | O | | O |
| IMAGING SETTING INFORMATION | O | △ | | |
| IMAGING ELEMENT INFORMATION | O | △ | | |
| LENS IDENTIFICATION INFORMATION | O | | △ | |
| POST-STAGE BREATHING CORRECTION INFORMATION | O | | | |

*FIG. 20*
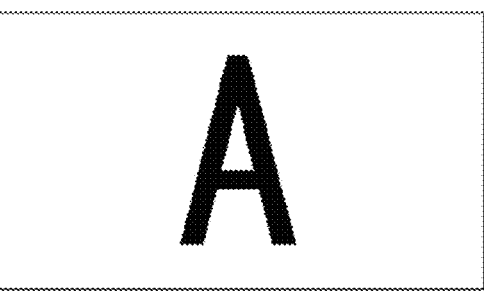
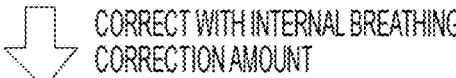
CORRECT WITH INTERNAL BREATHING
CORRECTION AMOUNT
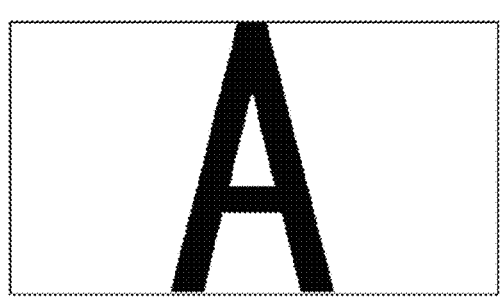
INVERSELY CONVERT WITH RECIPROCAL OF INTERNAL
BREATHING CORRECTION AMOUNT
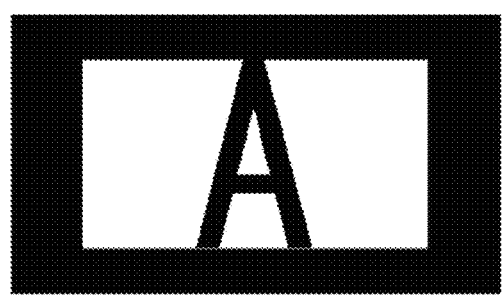
CORRECT WITH POST-STAGE BREATHING
CORRECTION AMOUNT
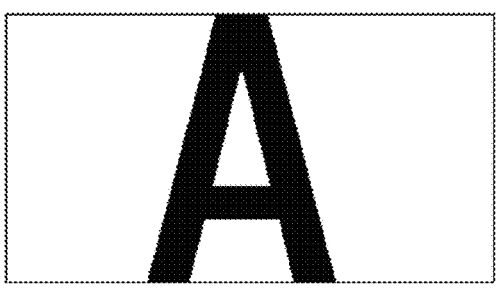

FIG. 21
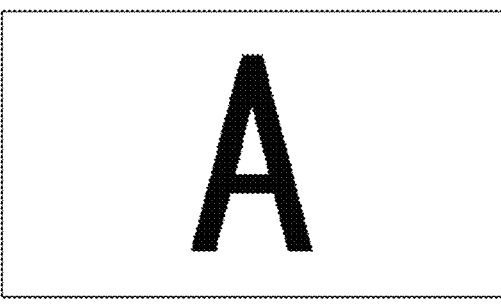
 CORRECT WITH INTERNAL BREATHING
CORRECTION AMOUNT
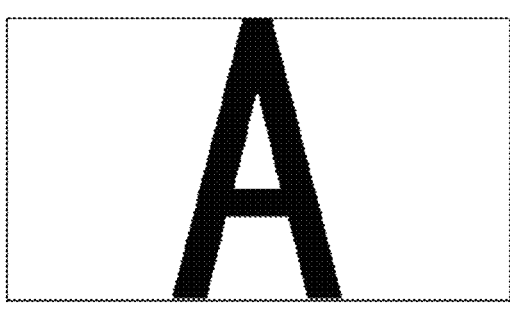
 CORRECT WITH POST-STAGE BREATHING CORRECTION AMOUNT/
INTERNAL BREATHING CORRECTION AMOUNT
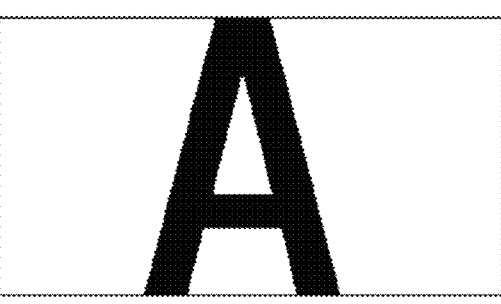

INFORMATION PROCESSING DEVICE, INFORMATION PROCESSING METHOD, AND PROGRAM

TECHNICAL FIELD

The present technology relates to an information processing device, an information processing method, and a program, and particularly relates to a technique of breathing correction that is correction of a change in an angle of view accompanying focus adjustment.

BACKGROUND ART

In a camera system configured to be capable of focus adjustment, it is known that a phenomenon in which an angle of view changes with focus adjustment, so-called breathing, occurs.

Patent Document 1 below describes performing breathing correction for a moving image obtained by imaging by an imaging element.

CITATION LIST

Patent Document

Patent Document 1: Japanese Patent Application Laid-Open No. 2008-42405

SUMMARY OF THE INVENTION

Problems to be Solved by the Invention

Here, in the technique described in Patent Document 1, the breathing correction is performed in real time for an image obtained by imaging by the imaging element. Therefore, in the technique described in Patent Document 1, the degree of freedom of the breathing correction is sometimes limited such that the breathing correction cannot be performed depending on a processing load of the breathing correction, or the breathing cannot be completely removed by the breathing correction in order to reduce image quality degradation.

The present technology has been made in view of the above circumstances, and an object thereof is to improve the degree of freedom of the breathing correction.

Solutions to Problems

An information processing device according to the present technology includes: an acquisition unit configured to acquire meta-information regarding breathing correction associated with a moving image; and a breathing correction unit configured to perform breathing correction for the moving image on a basis of the meta-information.

Therefore, the information processing device enables the breathing correction to be performed for the moving image on the basis of the meta-information regardless of whether or not the breathing correction has been performed for the moving image at the time of imaging.

BRIEF DESCRIPTION OF DRAWINGS

FIG. 3 is a block diagram illustrating an internal configuration of the imaging device and an interchangeable lens.

FIG. 11 is a table illustrating meta-information.

FIG. 16 is a diagram for describing a first post-stage breathing correction.

FIG. 17 is a diagram for describing an exposure center of gravity.

FIG. 20 is a diagram for describing an example of a method of processing the post-stage breathing correction.

FIG. 21 is a diagram for describing another example of the method of processing the post-stage breathing correction.

FIG. 22 is a diagram for describing an example of a UI screen.

FIG. 23 is a diagram for describing another example of the UI screen.

FIG. 24 is a diagram for describing another example of the UI screen.

FIG. 25 is a diagram for describing another example of the UI screen.

MODE FOR CARRYING OUT THE INVENTION

Hereinafter, an embodiment will be described in the following order.

<1. Breathing Correction System>
<2. Imaging Device>
[2.1. Configuration of Imaging Device]
[2.2. Focus-related Processing]
[2.3. AF Processing]
[2.4. Meta-information Acquisition Processing]
[2.5. Internal Breathing Correction]

[2.6. Meta-information Associating Processing]
[2.7. Processing Procedure]
<3. Computer>
[3.1. Configuration of Computer]
[3.2. Post-stage Breathing Correction]
[3.2.1. First Post-stage Breathing Correction]
[3.2.2. Second Post-stage Breathing Correction]
[3.2.3. Post-stage Breathing Correction After Internal Breathing Correction]
[3.3. UI Screen of Post-stage Breathing Correction]
[3.4. Processing Procedure]
<4. Modification>
<5. Summary of Embodiment>
<6. Present technology>

1. Breathing Correction System

Figure 1:
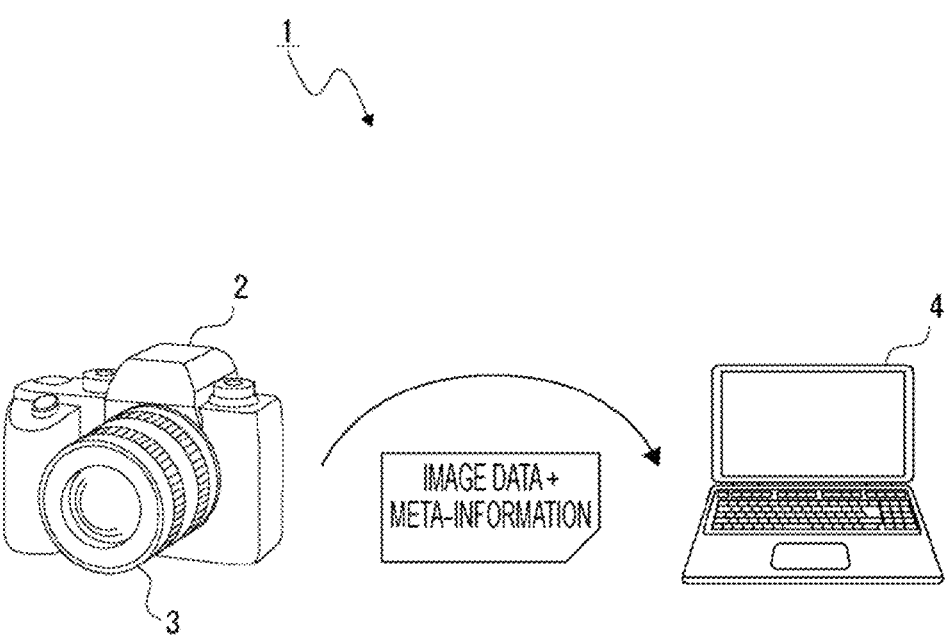
FIG. 1 is a diagram illustrating a configuration of a breathing correction system 1 as an embodiment according to the present technology.

FIG. 1 is a diagram illustrating a configuration of a breathing correction system 1 as an embodiment according to the present technology. As illustrated in FIG. 1, the breathing correction system 1 includes an imaging device 2 and a computer 4.

Figure 3:
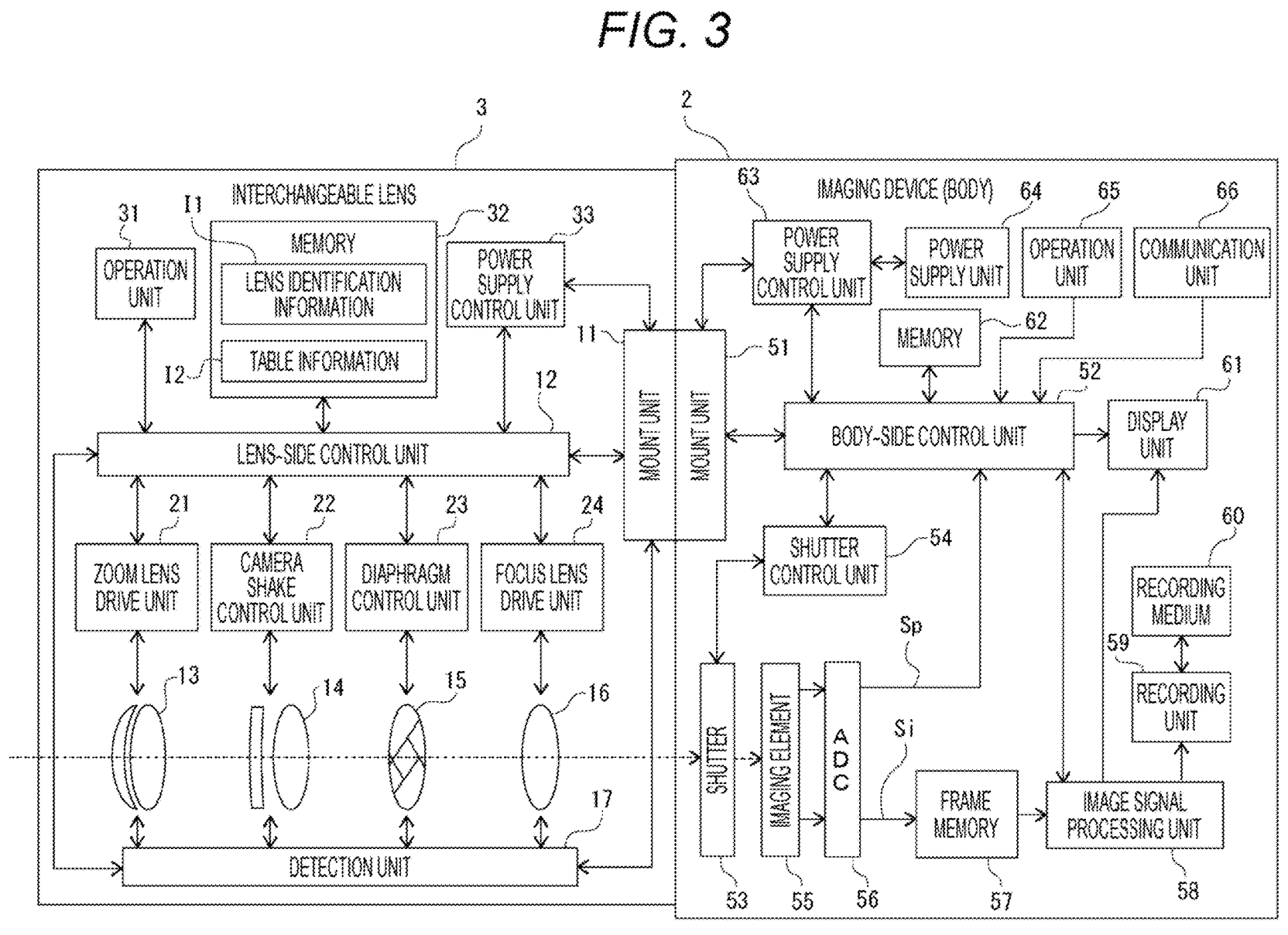

The imaging device 2 can perform breathing correction in real time for an image (moving image) obtained by capturing an object image incident through an interchangeable lens 3 including a focus lens 16 (see FIG. 3). Furthermore, the imaging device 2 acquires information regarding the breathing correction, and associates the acquired information with image data as meta-information.

The computer 4 is, for example, a personal computer, a mobile terminal device, a tablet terminal device, or the like, and can acquire the image data and the meta-information from the imaging device 2. Note that the computer 4 may be the imaging device 2.

Furthermore, the computer 4 may be a server or the like that performs cloud computing. In this case, the computer 4 acquires the image data and the meta-information transmitted from the imaging device 2 to a personal computer, a mobile terminal device, a tablet terminal device, or the like via a network.

The computer 4 can perform the breathing correction for the moving image based on the acquired image data on the basis of the meta-information.

As described above, in the breathing correction system 1, the imaging device 2 can perform the breathing correction in real time, and the computer 4 can perform the breathing correction after imaging.

Furthermore, in the breathing correction system 1, the computer 4 can perform the breathing correction after imaging without the imaging device 2 performing the breathing correction.

Note that the term "breathing" referred to herein means a phenomenon in which an angle of view changes with focus adjustment, and the term "breathing correction" means correction of such a change in the angle of view with focus adjustment. The breathing correction is performed by trimming (electronic cutout for) an image (a frame constituting the moving image).

Hereinafter, the breathing correction performed in real time in the imaging device 2 is referred to as internal breathing correction, and the breathing correction performed after imaging in the computer 4 is referred to as post-stage breathing correction. Then, in a case where the internal breathing correction and the post-stage breathing correction are described without distinction, they are simply referred to as the breathing correction.

2. Imaging Device

[2.1. Configuration of Imaging Device]

Figure 2:
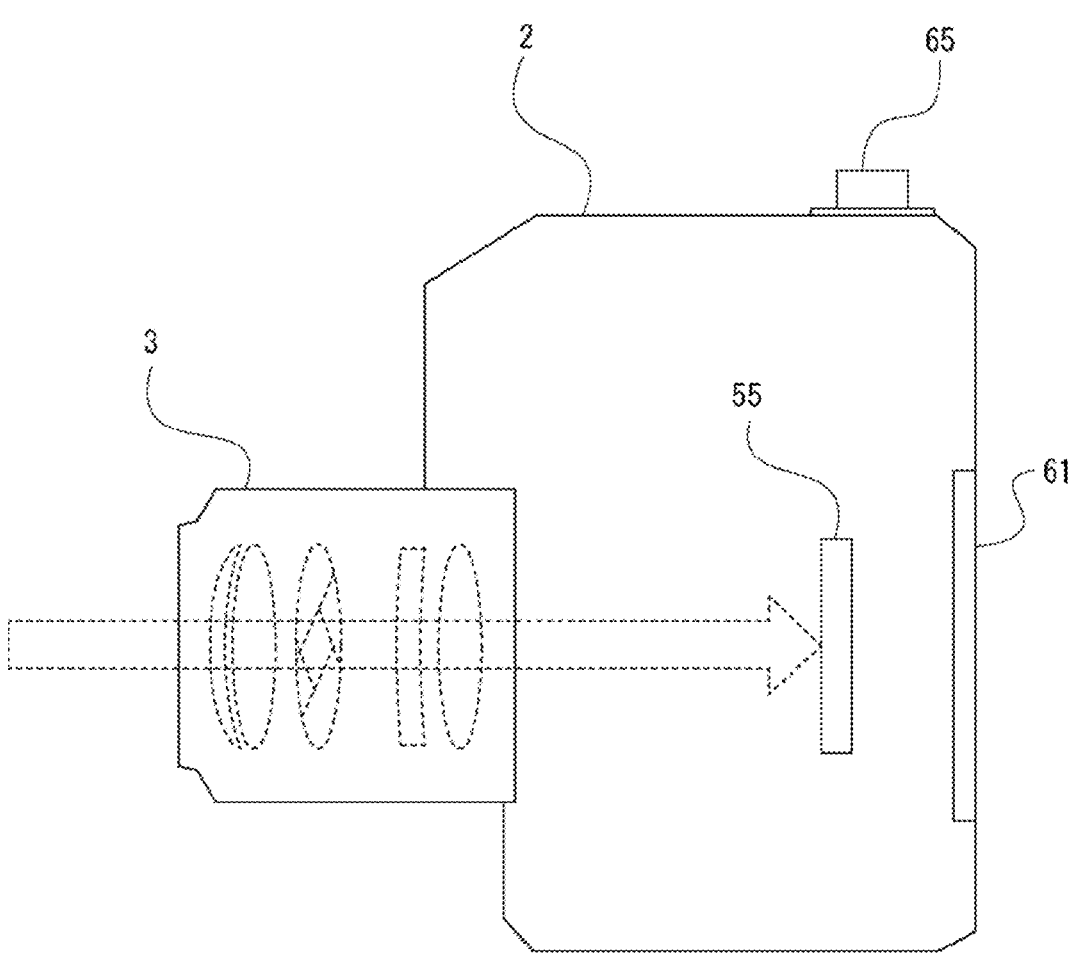
FIG. 2 is a diagram illustrating a configuration of an imaging device.

FIG. 2 is a diagram illustrating a configuration of the imaging device 2.

The imaging device 2 (body) is configured as a digital camera device to which the interchangeable lens 3 is detachably attached. The imaging device 2 has not only a function to capture a still image but also a function to capture a moving image.

As illustrated in FIG. 2, the imaging device 2 includes an imaging element 55 that captures an object image incident via the interchangeable lens 3, a display unit 61 capable of displaying a GUI such as a captured image obtained by the imaging element 55 and various operation screens, an operation unit 65 for a user to perform various operation inputs, and the like.

Furthermore, the imaging device 2 includes, for example, a configuration for recording the captured image by the imaging element 55, a configuration for performing image signal processing for the captured image by the imaging element 55, a configuration for performing communication with the interchangeable lens 3, and the like.

The interchangeable lens 3 is a lens unit in which various lenses such as a focus lens and a zoom lens are provided. Furthermore, the interchangeable lens 3 includes a drive unit that drives these lenses, a control unit that outputs a drive signal for the drive unit, a mount unit having a connection function and a communication function with respect to the imaging device 2, and the like.

FIG. 3 is a block diagram illustrating an internal configuration of the imaging device 2 and the interchangeable lens 3.

As illustrated in FIG. 3, the interchangeable lens 3 includes a mount unit 11 detachably attached to a mount unit 51 of the imaging device 2. The mount unit 11 has a plurality of terminals for electrical connection with the imaging device 2.

Furthermore, the interchangeable lens 3 includes a lens-side control unit 12, a zoom lens 13, a camera shake correction lens 14, a diaphragm 15, a focus lens 16, an operation unit 31, a memory 32, and a power supply control unit 33.

Moreover, the interchangeable lens 3 further includes a zoom lens drive unit 21, a camera shake control unit 22, a diaphragm control unit 23, a focus lens drive unit 24, and a detection unit 17.

The lens-side control unit 12 includes, for example, a microcomputer including a central processing unit (CPU), a read only memory (ROM), a random access memory (RAM), and the like, and performs overall control of the interchangeable lens 3 by the CPU reading a program stored in a predetermined storage device such as the ROM or the memory 32 into the RAM and executing the program.

For example, the lens-side control unit 12 controls a position of the zoom lens 13 on the basis of an instruction from the imaging device 2 supplied via a predetermined communication terminal of the mount unit 11 or a user's operation received by the operation unit 31.

Specifically, the lens-side control unit 12 acquires a current position of the zoom lens 13 detected by the detection unit 17 including, for example, a magnetic sensor (MR sensor). Then, the lens-side control unit 12 determines a driving direction and a driving amount for moving the zoom lens 13 to a predetermined position on the basis of an acquisition result, and outputs the determined driving direction and driving amount to the zoom lens drive unit 21 together with a movement command.

The zoom lens drive unit 21 moves the zoom lens 13 in an optical axis direction so as to achieve the instructed driving direction and driving amount on the basis of the movement command supplied from the lens-side control unit 12.

Here, the detection unit 17 comprehensively represents a configuration for detecting a state of the interchangeable lens 3, such as positions of the zoom lens 13, the camera shake correction lens 14, and the focus lens 16, and an aperture diameter of the diaphragm 15. The detection unit 17 can detect the position of the lens by, for example, a magnetic sensor, a photodiode array, a potentiometer, a reflective encoder, or the like.

The lens-side control unit 12 controls the camera shake correction lens 14 to correct camera shake. Specifically, the lens-side control unit 12 determines a driving direction and a driving amount of the camera shake correction lens 14 in a direction to cancel a camera shake amount on the basis of the camera shake amount detected by a camera shake detection sensor in the detection unit 17, and outputs the determined driving direction and driving amount to camera shake control unit 22 together with a movement command.

The camera shake detection sensor in the detection unit 17 includes, for example, both or one of a gyro sensor and a triaxial acceleration sensor. The gyro sensor is used to detect a shift (shake) in a direction corresponding to pitch or yaw as a correction direction of the camera shake correction lens 14. The triaxial acceleration sensor is used to detect a shift (shake) between an X-axis direction and a Y-axis direction when the optical axis direction is defined as a Z axis.

The camera shake control unit 22 moves the camera shake correction lens 14 so as to achieve the instructed driving direction and driving amount on the basis of the movement command supplied from the lens-side control unit 12.

Furthermore, in a case where a power supply is turned off, the lens-side control unit 12 performs control to mechanically lock the camera shake correction lens 14. In a state where power is supplied from the imaging device 2 to the interchangeable lens 3, control of the camera shake correction lens 14 is maintained at a predetermined position by control via the camera shake control unit 22. On the other hand, when the power supply is turned off, the position control by the camera shake control unit 22 is stopped, so that the camera shake correction lens 14 falls by a predetermined amount in the gravity direction.

Therefore, the lens-side control unit 12 mechanically locks the camera shake correction lens 14 via the camera shake control unit 22 according to timing when the power supply is turned off to prevent a fall. The camera shake control unit 22 mechanically locks the camera shake correction lens 14 on the basis of a fixing command supplied from the lens-side control unit 12.

Furthermore, the lens-side control unit 12 controls (the aperture diameter of) the diaphragm 15 in accordance with an instruction from the imaging device 2 supplied via a predetermined communication terminal of the mount unit 11, or the like. Specifically, the lens-side control unit 12 acquires the aperture diameter of the diaphragm 15 detected by a diaphragm detection sensor in the detection unit 17, and issues a command to the diaphragm control unit 23 so as to obtain an F-number instructed by the imaging device 2 to drive the diaphragm 15. The diaphragm control unit 23 drives the diaphragm 15 to have the aperture diameter instructed from the lens-side control unit 12.

Moreover, the lens-side control unit 12 controls the position of the focus lens 16 on the basis of the instruction from the imaging device 2 supplied via a predetermined communication terminal of the mount unit 11.

Here, for example, in auto focus (AF) processing, information of a target focus lens position (target focus lens position) is instructed from the imaging device 2 to the lens-side control unit 12.

The lens-side control unit 12 acquires the current position of the focus lens 16 from the detection unit 17, and determines a driving direction and a driving amount for moving the focus lens 16 to the target position on the basis of the acquired information of the current position and the information of the target focus lens position instructed from the imaging device 2. Then, the lens-side control unit 12 outputs the determined driving direction and driving amount to the focus lens drive unit 24 together with a movement command.

The focus lens drive unit 24 moves the focus lens 16 in the optical axis direction so as to achieve the instructed driving direction and driving amount.

Here, the focus lens 16 is configured as a "focus lens group" including one or a plurality of optical elements. In a case where the focus lens group includes a plurality of optical elements, the optical elements are integrally displaced with focus adjustment.

Note that the same similarly applies to the zoom lens 13. That is, the zoom lens 13 is configured as a "zoom lens group" including one or a plurality of optical elements, and in a case where the zoom lens group includes a plurality of optical elements, the optical elements are integrally displaced with zoom adjustment.

In the present example, the zoom lens 13 and the focus lens 16 are respectively configured as one zoom lens group and one focus lens group. However, the zoom lens 13 and the focus lens 16 may respectively include a plurality of zoom lens groups and a plurality of focus lens groups.

Furthermore, the lens-side control unit 12 performs processing of transmitting the position of the zoom lens 13 (hereinafter referred to as "zoom lens position") and the position of the focus lens 16 (hereinafter referred to as "focus lens position") detected by the detection unit 17 to the imaging device 2 (body-side control unit 52).

The focus lens drive unit 24 can include, for example, an ultrasonic motor, a DC motor, a linear actuator, a stepping motor, a piezo element (piezoelectric element), and the like as a drive source of the lens.

Note that the focus adjustment can be configured to be performed according to the user's operation received by the operation unit 31.

The memory 32 includes a non-volatile memory such as an electrically erasable programmable (EEP) ROM, for example, and can be used to store an operation program of the lens-side control unit 12 and various data.

The memory 32 stores lens identification information I1 and table information I2 (lens information), which will be described below.

The power supply control unit 33 detects the amount of power of the power supply supplied from the imaging device 2, optimally distributes the amount of power to each unit (the lens-side control unit 12 or various drive units) in the interchangeable lens 3 on the basis of the detected amount of power, and supplies the power.

The imaging device 2 on the body side is provided with the mount unit 51 to which the interchangeable lens 3 is detachably attached. The mount unit 51 has a plurality of terminals for electrical connection with the mount unit 11 of the interchangeable lens 3.

When the interchangeable lens 3 is mounted on the mount unit 51 of the imaging device 2, corresponding terminals are electrically and physically connected between the mount unit 51 and the mount unit 11 of the interchangeable lens 3. Examples of the terminals to be connected include a terminal for supplying the power (power supply terminal), a terminal for transmitting a command or data (communication terminal), and a terminal for transmitting a synchronization signal (synchronization signal terminal).

The imaging device 2 further includes the body-side control unit 52, a shutter 53, a shutter control unit 54, an imaging element 55, an analog to digital converter (ADC) 56, a frame memory 57, an image signal processing unit 58, a recording unit 59, a recording medium 60, a display unit 61, a memory 62, a power supply control unit 63, a power supply unit 64, an operation unit 65, and a communication unit 66.

The power supply control unit 63 supplies the power supplied from the power supply unit 64 to each unit of the imaging device 2 including the body-side control unit 52. Furthermore, the power supply control unit 63 calculates an amount of power of the power supply that can be supplied to the interchangeable lens 3 on the basis of the operation state of the imaging device 2, and supplies the power supply to the interchangeable lens 3 via the mount unit 51.

The power supply unit 64 includes, for example, a secondary battery such as a NiCd battery, a NiMH battery, or a Li battery. Note that the power supply unit 64 can also be configured to be able to receive power supply from a commercial AC power supply via an AC adapter or the like.

The body-side control unit 52 includes a microcomputer including a CPU, a ROM, a RAM, and the like, and performs overall control of the imaging device 2 and the interchangeable lens 3 by the CPU reading a program stored in a predetermined storage device such as the ROM or the memory 62 into the RAM and executing the program.

The memory 62 includes a non-volatile memory such as an EEPROM, for example, and can be used to store an operation program of the body-side control unit 52 and various data.

The body-side control unit 52 causes the imaging element 55 to execute imaging processing on the basis of an operation signal indicating a user's operation supplied from the operation unit 65. Moreover, the body-side control unit 52 transmits a predetermined command to the interchangeable lens 3 side via the mount unit 51 to drive the focus lens 16, the zoom lens 13, and the like.

Furthermore, the body-side control unit 52 can acquire, for example, information indicating the zoom lens position and the focus lens position from the detection unit 17 in the interchangeable lens 3.

The shutter 53 is disposed on a front surface (object side) of the imaging element 55, and is opened and closed under the control of the shutter control unit 54. When the shutter 53 is in a closed state, light of the object passing through an optical system of the interchangeable lens 3 is blocked. The shutter control unit 54 detects an open/close state of the shutter 53 and supplies information indicating a detection result to the body-side control unit 52. The shutter control unit 54 drives the shutter 53 to the open state or the closed state on the basis of the control of the body-side control unit 52.

The imaging element 55 is configured as, for example, an image sensor including a charge coupled device (CCD)

sensor, a complementary metal oxide semiconductor (CMOS) sensor, or the like, and outputs a received light signal obtained by imaging an object.

In a case where the imaging element 55 includes the CCD sensor or the CMOS sensor, an electronic shutter can be used and thus the shutter 53 can be omitted. In a case where the shutter 53 is omitted, the shutter control unit 54 used for the control is also omitted.

The imaging element 55 includes pixels (RGB pixels) for capturing an image, and pixels for acquiring detection information to be used for AF processing by an image-plane phase difference method, that is, phase difference detection pixels for acquiring phase difference information between a pair of images (phase difference information between a pair of images formed by pupil division).

In the imaging element 55, the phase difference detection pixels are discretely arranged on a pixel array surface in which the RGB pixels are two-dimensionally arrayed by a predetermined array pattern such as a Bayer array.

A received light signal obtained by photoelectric conversion of the RGB pixels in the imaging element 55 is converted into a digital signal by the ADC 56, temporarily held in the frame memory 57, and then input to the image signal processing unit 68.

In FIG. 3, a captured image signal obtained by digitally converting the received light signal of the RGB pixels as described above is described to as a "captured image signal Si".

Meanwhile, a received light signal obtained by photoelectric conversion of the phase difference detection pixels in the imaging element 55 is converted into a digital signal by the ADC 56 and supplied to the body-side control unit 52.

In FIG. 3, a signal obtained by the digital conversion of the received light signal of the phase difference detection pixels is described to as a "phase difference pixel signal Sp".

The body-side control unit 52 analyzes a phase difference between the pair of images on the basis of the phase difference pixel signal Sp supplied via the ADC 56, and calculates a focus shift amount with respect to an object (object to be focused) to be focused, that is, a defocus amount DF.

The body-side control unit 52 performs the AF processing on the basis of the defocus amount DF calculated in this manner, which will be described again.

Furthermore, the body-side control unit 52 performs processing related to the breathing correction.

The body-side control unit 52 performs processing of acquiring the meta-information related to the breathing correction (meta-information acquisition processing) and processing of the above-described internal breathing correction (internal breathing correction processing), which will be described below.

The image signal processing unit 58 applies predetermined image signal processing to the captured image input via the frame memory 57. Examples of the image signal processing here include demosaic processing, white balance (WB) adjustment, gamma correction processing, and the like.

The image signal processing unit 58 applies the image signal processing to the captured image as a raw image input via the frame memory 57, then converts the captured image into image data in a predetermined file format, and records the image data in the recording medium 60 via the recording unit 59.

At this time, as will be described in detail below, the body-side control unit 52 associates the image data recorded on the recording medium 60 with the meta-information related to the breathing correction. As a method of associating the meta-information, the meta-information may be associated as part of the image data, or may be associated as data different from the image data.

Furthermore, the recording unit 59 may associate the meta-information with the image data and record the meta-information and the image data on the recording medium 60. Furthermore, the communication unit 66 may associate the meta-information with the image data and transmit the meta-information and the image data to the computer 4. That is, the recording unit 59 and the communication unit 66 may function as a meta-information associating unit.

Furthermore, the image signal processing unit 58 converts the captured image to which the image signal processing has been applied into an image signal according to a predetermined display format, supplies the image signal to the display unit 61, and displays the captured image.

Furthermore, the image signal processing unit 58 can perform the internal breathing correction processing for the moving image. In the internal breathing correction processing, the image signal processing unit 58 trims an image (a frame constituting the moving image) on the basis of an instruction from the body-side control unit 52.

Furthermore, the image signal processing unit 58 in the present example can perform enlargement processing and reduction processing for the captured image for distortion aberration correction.

Note that, as a distortion aberration correction method, for example, a method described in "Japanese Patent Application Laid-Open No. 2019-208168" can be adopted.

The recording medium 60 includes a non-volatile memory, and the recording unit 59 is configured to be able to write data to the recording medium 60 and read data recorded in the recording medium 60. Here, the recording medium 60 may be detachable from the imaging device 2.

The display unit 61 includes a panel-type display device such as a liquid crystal panel or an organic EL panel, and can display an image.

The display unit 61 is mounted on a back surface opposite to the front surface of the imaging device 2 on which the mount unit 51 is disposed, and can display a so-called through image, an image read from the recording medium 60, a GUI as various operation screens, and the like.

The operation unit 65 comprehensively represents operators for the user to perform operation inputs to the imaging device 2, such as various hardware keys such as a shutter button, a mode dial, and a zoom button, and a touch panel provided capable of detecting a touch operation on a display screen of the display unit 61.

The operation unit 65 receives the user's operation and supplies an operation signal corresponding to the operation to the body-side control unit 52.

The communication unit 66 performs wired or wireless communication with the computer 4, for example.

Here, in the following description, focus-related processing including the AF processing and the internal breathing correction processing will be described. In the present specification, "object position", "object distance", "in-focus position", "in-focus distance", "focus lens position", "zoom lens position", and "focal length" are used as terms regarding the focus-related processing.

Figure 4A:
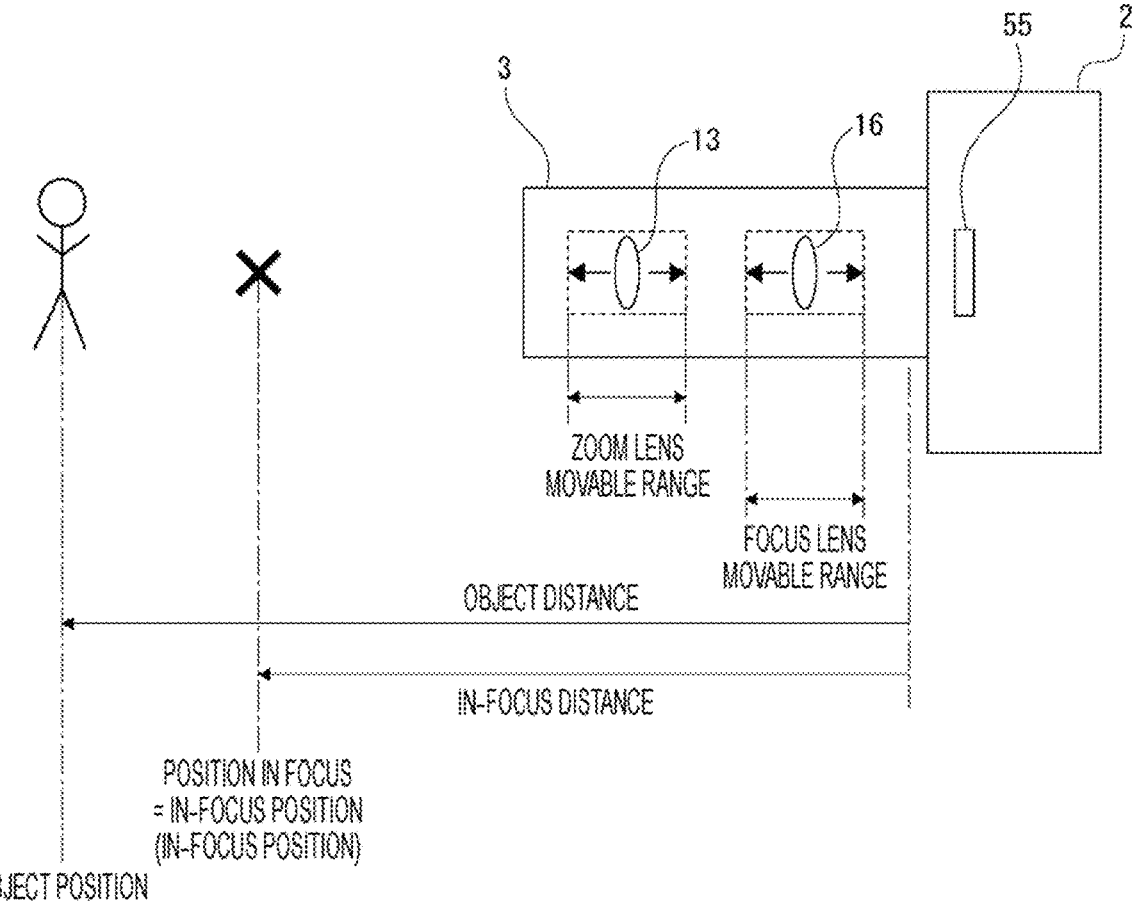
FIG. 4A is a diagram for describing an object position, an object distance, an in-focus position, an in-focus distance, a focus lens position, and a zoom lens position.
Figure 4B:
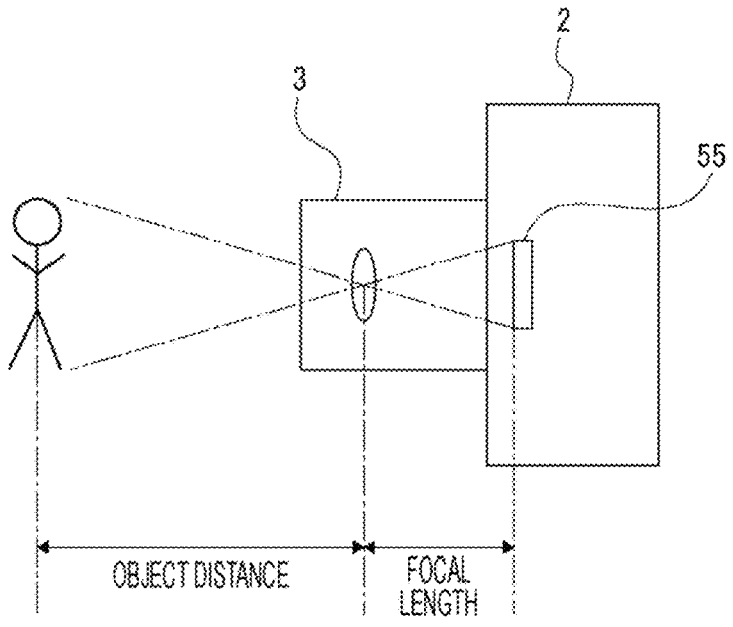
FIG. 4B is a diagram illustrating a focal length.

Definitions of these terms will be described with reference to FIGS. 4A and 4B. FIG. 4A is a diagram for describing the object position, object distance, in-focus position, in-focus distance, focus lens position, and zoom lens position. FIG. 4B is a diagram illustrating a focal length.

First, in FIG. 4A, the "object position" literally represents the position where an object exists, and the "object distance" represents a distance from the imaging device 2 to the object.

The "in-focus position" represents a position in focus, and can be rephrased as an "in-focus position". The "in-focus distance" means a distance from the imaging device 2 to the in-focus position.

Here, as understood with reference to FIG. 4A, the object distance and the in-focus distance are distances to a position outside the interchangeable lens 3, and are values represented by actual distances such as 2 m, 3 m, 4 m, . . . , for example.

The "focus lens position" means the position of the focus lens 16 within a movable range of the focus lens 16 in the interchangeable lens 3 as illustrated in FIG. 4A, and the "zoom lens position" similarly means the position of the zoom lens 13 within a movable range of the zoom lens 13 in the interchangeable lens 3.

Furthermore, as illustrated in FIG. 4B, the "focal length" represents the distance from the imaging element 55 to a focal point. Note that, as illustrated in FIG. 4B, the "object distance" strictly corresponds to the distance from the focal point to the "object position".

Here, if the "object position" in FIG. 4A is the position of the object to be focused, the defocus amount DF obtained by the image plane phase difference method represents the shift amount between the "object position" and the "in-focus position". That is, the defocus amount DF in this case does not directly represent an error amount of the focus lens position.

Note that, in the following description, an example of using information that directly indicates the position of the zoom lens 13 is used as the "zoom lens position" will be given. However, the "zoom lens position" is not necessarily limited to the information directly indicating the position of the zoom lens 13, and information of a "zoom position" that is correlated with the position of the zoom lens 13 and can be uniquely converted into information of the position of the zoom lens 13 can also be used as the "zoom lens position".

As a basic flow of the AF processing assumed in the present example, the body-side control unit 52 obtains a target position of the focus lens 16 (hereinafter referred to as a "target focus lens position") necessary for focusing on the object to be focused on the basis of the defocus amount DF, and instructs information of the target focus lens position to the interchangeable lens 3 side.

[2.2. Focus-Related Processing]

Functions of the interchangeable lens 3 and the imaging device 2 will be described with reference to FIGS. 5 and 6.

Figure 5:
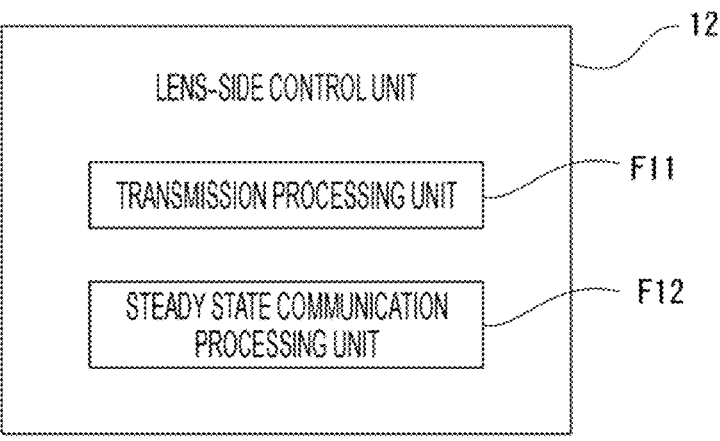
FIG. 5 is a functional block diagram of a lens-side control unit.

FIG. 5 is a functional block diagram of the lens-side control unit 12. FIG. 6 is a functional block diagram of the body-side control unit 52.

As illustrated in FIG. 5, the lens-side control unit 12 has functions as a transmission processing unit F11 and a steady state communication processing unit F12.

Figure 6:
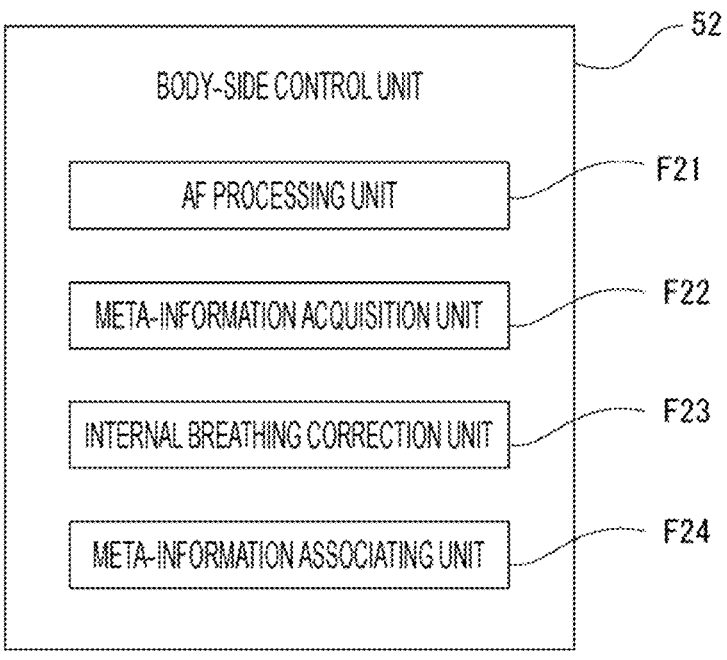
FIG. 6 is a functional block diagram of a body-side control unit.

Furthermore, as illustrated in FIG. 6, the body-side control unit 52 functions as an AF processing unit F21, a meta-information acquisition unit F22, an internal breathing correction unit F23, and a meta-information associating unit F24.

The transmission processing unit F11 performs processing of transmitting the lens identification information I1 for identifying the interchangeable lens 3 and the table information 12 indicating correction characteristics for the breathing correction to the imaging device 2 in response to an inquiry made by the imaging device 2 when the interchangeable lens 3 is attached.

Here, prior to description of the table information 12, an aspect of the change in the angle of view as the breathing and an outline of the breathing correction will be described with reference to FIG. 7.

Figure 7:
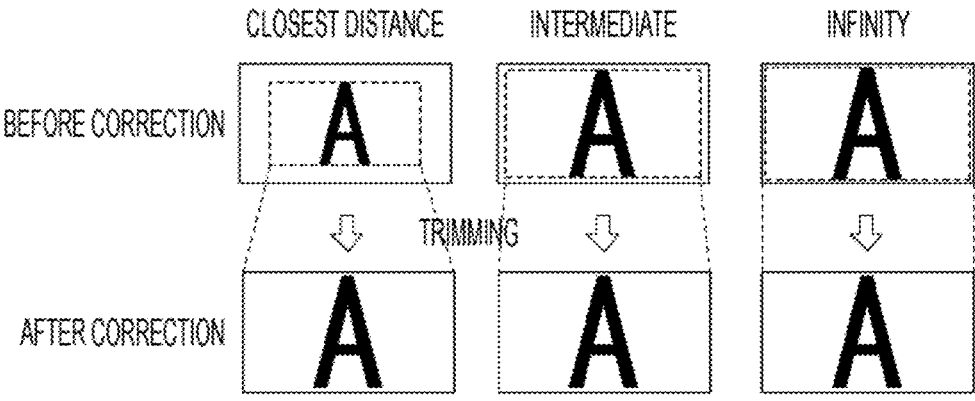
FIG. 7 is a diagram for describing an outline of breathing correction.

FIG. 7 is a diagram for describing an outline of the breathing correction.

In FIG. 7, the upper part with "before correction" illustrates an example of the change in the angle of view with respect to a change in the in-focus position from infinity to the closest distance in a case of capturing the same object at the same distance. As illustrated in the drawing, the size of an image (an alphabet A in the example in the drawing) in the captured image is the largest at infinity, the size of the image is the smallest at the closest distance, and the size of the image at the in-focus position between the infinity and the closest distance is smaller than that at infinity and larger than that at the closest distance. As can also be understood from this point, the change in the angle of view as breathing is caused by a mode in which the angle of view at infinity is the narrowest and the angle of view gradually increases with respect to the change in the in-focus position to the closest distance side.

Therefore, as illustrated as "after correction" in the lower part of the drawing, the breathing correction by trimming is performed by setting trimming magnification at infinity to "1.0" (that is, without trimming) and gradually increasing the trimming magnification with respect to the change in the in-focus position to the closest distance side.

As a result, even if the in-focus position changes (that is, even if focus adjustment is performed), the angle of view of the captured image can be prevented from changing.

Figure 8:
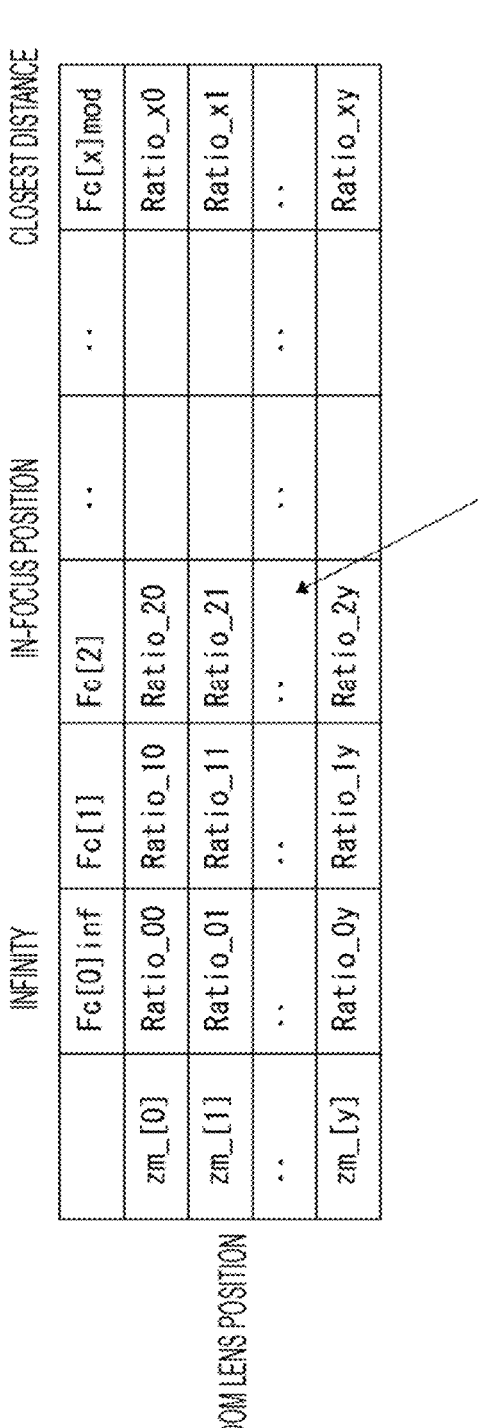
FIG. 8 is a diagram illustrating an example of a breathing correction amount table.
Figure 9:
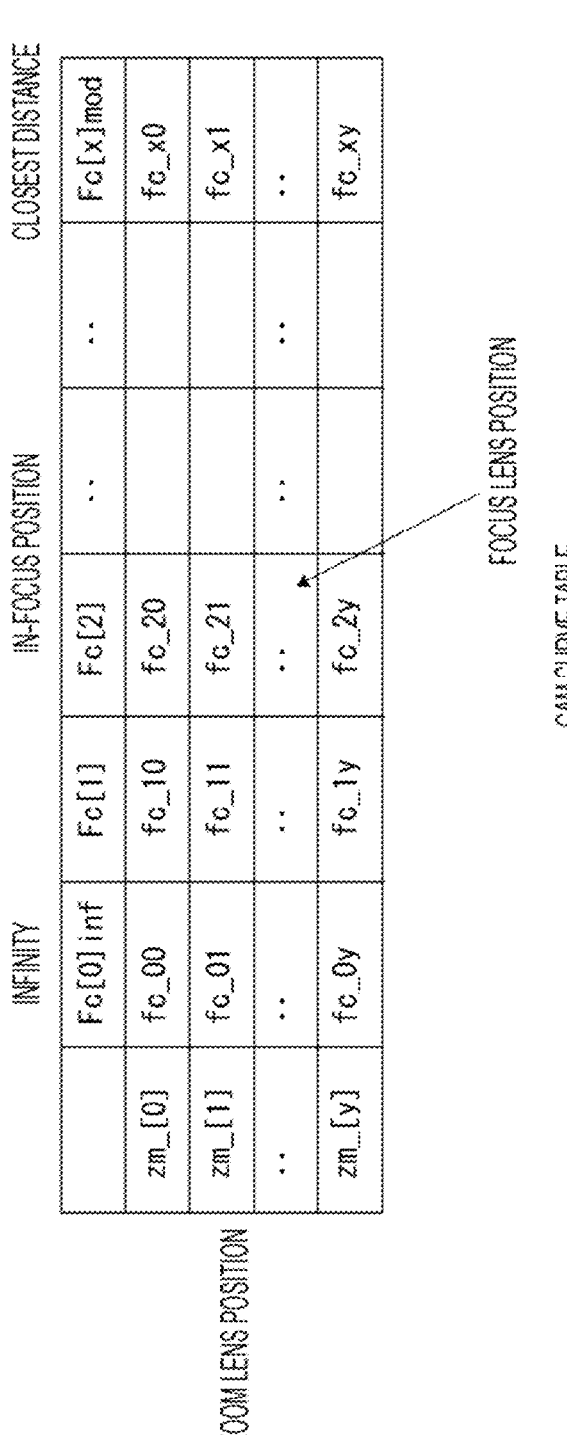
FIG. 9 is a diagram illustrating an example of a cam curve table.
Figure 10:
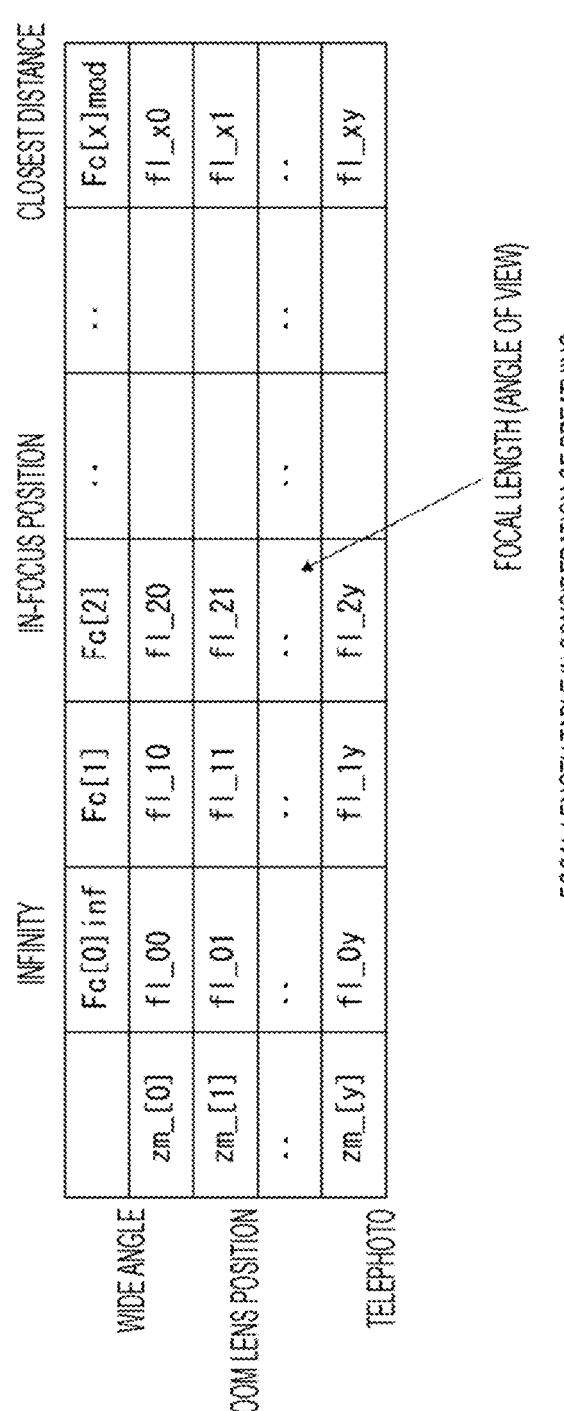
FIG. 10 is a diagram illustrating an example of a focal length table in which breathing is taken into consideration.

FIG. 8 is a diagram illustrating an example of a breathing correction amount table. FIG. 9 is a diagram illustrating an example of a cam curve table. FIG. 10 is a diagram illustrating an example of a focal length table in which breathing is taken into consideration.

The above-described table information 12 includes a breathing correction amount table as illustrated in FIG. 8, a cam curve table as illustrated in FIG. 9, and a focal length table in which breathing is taken into consideration as illustrated in FIG. 10.

As illustrated in FIG. 8, the breathing correction amount table indicates a breathing correction amount for each combination of the zoom lens position and the in-focus position. Specifically, in the breathing correction amount table, the zoom lens position on the vertical axis represents each zoom lens position from the zoom lens position at one end to the zoom lens position at the other end of the zoom lens movable range illustrated in FIG. 4A, and the in-focus position on the horizontal axis represents each in-focus position from the in-focus position corresponding to infinity to the in-focus position corresponding to the closest distance.

Note that, in the breathing correction amount table, increments of the zoom lens position and the in-focus position are arbitrary.

Furthermore, in the breathing correction amount table, the breathing correction amount is information indicating the trimming magnification for performing the breathing correction by trimming the captured image in the present example.

Characteristics of the change in the angle of view as breathing can vary depending on the type or individual of the interchangeable lens 3. Therefore, for each interchangeable lens 3, the breathing correction amount table corresponding to the characteristics of the interchangeable lens 3 is stored in the memory 32.

By performing the breathing correction using such a breathing correction amount table, appropriate breathing correction according to the characteristics of each interchangeable lens 3 can be realized.

As illustrated in FIG. 9, the cam curve table indicates a relationship among the zoom lens position, the focus lens position, and the in-focus position. Specifically, the cam curve table indicates the focus lens position for each combination of the zoom lens position and the in-focus position. Note that, in the cam curve table, the increments of the zoom lens position and the in-focus position are arbitrary.

The information of the zoom lens position and the in-focus position is given by the cam curve table, so that the information of the focus lens position corresponding to the combination of the zoom lens position and the in-focus position can be acquired. Furthermore, the information of the zoom lens position and the focus lens position is given, information of the in-focus position corresponding to the combination of the zoom lens position and the focus lens position can be acquired.

Since characteristics of the cam curve table may vary depending on the type or individual of the interchangeable lens 3, the cam curve table corresponding to the characteristics of the interchangeable lens 3 is stored in the memory 32 for each interchangeable lens 3.

As illustrated in FIG. 10, the focal length table in which breathing is taken into consideration indicates the focal length (angle of view) for each combination of the zoom lens position and the in-focus position. Note that, in the focal length table in which breathing is taken into consideration, increments of the zoom lens position and the in-focus position are arbitrary.

The focal length table in which breathing is taken into consideration shows, for each zoom lens position, characteristics of the change in the angle of view when the in-focus position is changed from infinity to the closest distance.

The focal length acquired by the focal length table in which breathing is taken into consideration is sometimes used when calculating the breathing correction amount instead of the breathing correction amount acquired using the ca and the breathing correction amount table in a case where the zoom lens position does not change. For example, a ratio of the focal length acquired by the focal length table to the focal length at infinity can be calculated as the breathing correction amount.

Furthermore, in FIG. 4, the steady state communication processing unit F12 has a function to transmit information required to be sequentially transmitted from the interchangeable lens 3 to the imaging device 2. Specifically, it is a function to perform periodic transmission at regular intervals.

An example of information periodically transmitted to the imaging device 2 includes at least the information of the focus lens position and the zoom lens position. That is, the steady state communication processing unit F12 performs processing of sequentially transmitting the information of the focus lens position and the zoom lens position detected by the detection unit 17 to the imaging device 2 (body-side control unit 52).

[2.3. AF Processing]

Next, functions of the body-side control unit 52 will be described.

The AF processing unit F21 performs AF processing, specifically, processing of acquiring the defocus amount DF described above, and processing of acquiring the target focus lens position for focusing on the object to be focused on the basis of the defocus amount DF.

In obtaining the target focus lens position from the defocus amount DF, the information of the zoom lens position and the focus lens position for each frame sequentially transmitted from the interchangeable lens 3 side by the above-described steady state communication processing unit F12 and the cam curve table transmitted by the transmission processing unit F11 are used. Specifically, the AF processing unit F21 obtains an in-focus position (hereinafter referred to as a "target in-focus position") for focusing on the object to be focused on the basis of the information of the current zoom lens position and focus lens position (of the current frame) transmitted from the interchangeable lens 3 side and the cam curve table.

That is, the AF processing unit F21 acquires the current in-focus position on the basis of the current zoom lens position and focus lens position and the cam curve table. Then, the AF processing unit F21 calculates the target in-focus position on the basis of the current in-focus position and the defocus amount DF.

Next, the AF processing unit F21 acquires the target focus lens position on the basis of the target in-focus position, the current zoom lens position, and the cam curve table.

The AF processing unit F21 instructs the information of the target focus lens position acquired as described above to the lens-side control unit 12. As a result, in the interchangeable lens 3, the focus lens 16 is driven so that the focus lens position coincides with the target focus lens position, and AF is realized.

Note that, in the above example, the processing of obtaining the target focus lens position from the defocus amount DF is performed on the imaging device 2 side, but the processing of obtaining the target focus lens position from the defocus amount DF can also be performed on the interchangeable lens 3 side. In this case, the body-side control unit 52 transmits the information of the defocus amount DF to the lens-side control unit 12, and the lens-side control unit 12 only needs to acquire the target focus lens position on the basis of the cam curve table stored in the memory 32.

[2.4. Meta-Information Acquisition Processing]

FIG. 11 is a table illustrating the meta-information. The meta-information acquisition unit F22 acquires the meta-information regarding the breathing correction. As illustrated in FIG. 11, the meta-information associated with the image data includes table information, breathing correction amount minimum value maximum value information, focal length information, internal breathing correction presence/absence information, internal breathing correction amount information, breathing correction amount information, optical breathing correction information, lens position information, imaging setting information, imaging element information, lens identification information, post-stage breathing correction information, and the like.

These pieces of meta-information include meta-information that changes for each frame constituting the image data and meta-information that does not change for each frame constituting the image data. Then, the meta-information that changes for each frame may be referred to as frame meta-information, and the meta-information that does not change for each frame may be referred to as clip meta-information. Furthermore, the frame meta-information includes meta-information whose value changes for each frame and meta-information whose value changes only at a predetermined change and does not change at other timings.

Furthermore, meta-information acquired in real time such as for each frame may be referred to as real-time meta-information, and meta-information acquired only once may be referred to as non-real-time meta-information.

The table information is a table used when the breathing correction amount is obtained, specifically, the cam curve table and the breathing correction amount table. The meta-information acquisition unit F22 acquires the table information transmitted by the interchangeable lens 3 in response to an inquiry made to the interchangeable lens 3.

Here, since the table information is not changed unless the interchangeable lens 3 is removed while capturing the moving image, the table information is normally treated as clip meta-information. However, in a case where the interchangeable lens 3 is replaced while capturing the moving image, the table information is acquired at the timing (at the time of change) when the interchangeable lens 3 is replaced, and is thus treated as frame meta-information.

The breathing correction amount minimum value maximum value information indicates the breathing correction amount that becomes the minimum value and the breathing correction amount that becomes the maximum value among the breathing correction amounts acquired for the respective frames constituting the image data, and is clip meta-information. When acquiring the breathing correction amount for each frame at the time of capturing the moving image, the meta-information acquisition unit F22 determines whether the acquired breathing correction amount is less than the minimum value or greater than the maximum value. Then, in a case where the obtained breathing correction amount is less than the minimum value, the meta-information acquisition unit F22 updates the minimum value with the obtained breathing correction amount. Furthermore, in a case where the obtained breathing correction amount is larger than the maximum value, the meta-information acquisition unit F22 updates the maximum value with the obtained breathing correction amount. In this way, the meta-information acquisition unit F22 acquires the minimum value and the maximum value of the breathing correction amount in the image data (moving image).

The focal length information is information indicating the focal length acquired on the basis of the cam curve table and the focal length table in which breathing is taken into consideration, and is frame meta-information. The meta-information acquisition unit F22 acquires the focal length on the basis of the focus lens position and the zoom lens position acquired from the detection unit 17 for each frame and the cam curve table and the focal length table in which breathing is taken into consideration.

The internal breathing correction presence/absence information is information indicating whether or not the internal breathing correction has been performed by the imaging device 2, and is usually treated as clip meta-information since execution or non-execution of the internal breathing correction is determined in units of image data. Note that, in the imaging device 2, the internal breathing correction can be performed only for a predetermined image range (part) in the image data, and no internal breathing correction can be performed for the other image range. Therefore, in a case where the internal breathing correction is performed only for a part of the image data, the information may be treated as frame meta-information associated with the frame for which the internal breathing correction has been performed.

When the capturing of the moving image is finished, the meta-information acquisition unit F22 determines whether or not the internal breathing correction has been performed by the internal breathing correction unit F23, and acquires a determination result as the internal breathing correction presence/absence information.

The internal breathing correction amount information is information indicating the internal breathing correction amount actually applied in the internal breathing correction, and is frame meta-information. The meta-information acquisition unit F22 acquires the internal breathing correction amount of the internal breathing correction to be performed by the internal breathing correction unit F23 for each frame.

The breathing correction amount information is information regarding the breathing correction amount and is frame meta-information. The breathing correction amount information includes, for example, the breathing correction amount before the internal breathing correction is performed by a limiting method or a proportional method to be described below in detail, the internal breathing correction amount when the internal breathing correction is performed by the limiting method or the proportional method, and information regarding whether or not limitation has been applied by the limiting method or the proportional method.

The meta-information acquisition unit F22 acquires these pieces of breathing correction amount information for each frame, and details thereof will be described below.

The optical breathing correction information is information of whether or not optical breathing correction has been performed and an optical breathing correction amount, and is frame meta-information. Note that, in a case where the optical breathing correction has not been performed, information indicating that the optical breathing correction has not been performed may be associated as clip meta-information.

Note that the optical breathing correction is a method of correcting the breathing (the change in the angle of view) generated due to movement of the focus lens 16 by moving the zoom lens 13.

In a case where the optical breathing correction has been performed, the meta-information acquisition unit F22 acquires the optical breathing correction amount for each frame.

The lens position information is information indicating the focus lens position and the zoom lens position, and is frame meta-information. That is, the meta-information acquisition unit F22 acquires the focus lens position and the zoom lens position detected by the detection unit 17 for each frame (with frame period).

Furthermore, the meta-information acquisition unit F22 may acquire the focus lens position and the zoom lens position detected by the detection unit 17 at sampling intervals shorter than the frame period. The sampling interval only needs to be fixed or determined according to an exposure time, a frame rate, or the like of the imaging element 55. For example, the sampling interval may be shortened as the exposure time is shorter, or the sampling interval may be shortened as the frame rate is faster.

The imaging setting information is information regarding imaging setting at the time of imaging, and includes, for example, presence/absence of distortion aberration correction, exposure time, F-number, and the like. The imaging setting information is clip meta-information in a case where the information is not changed during imaging, or is frame meta-information in a case where the information is changed during imaging.

For example, the meta-information acquisition unit F22 acquires the imaging setting information at the start of capturing the moving image.

The imaging element information is information regarding settings of the imaging element 55, such as the number of readout lines of the imaging element 55, coordinates of an imaging area in the imaging element 55, a readout start time, and a readout time, and is clip meta-information in a case where the information is not changed during imaging or is frame meta-information in a case where the information is changed during imaging.

For example, the meta-information acquisition unit F22 acquires the imaging element information at the start of capturing the moving image.

The lens identification information is the lens identification information I1 stored in the memory 32 of the interchangeable lens 3, and is, for example, a lens name, a lens ID, a lens number, and the like. The lens identification information is not changed unless the interchangeable lens 3 is removed while capturing the moving image, the lens identification information is normally treated as clip meta-information. However, in a case where the interchangeable lens 3 is replaced while capturing the moving image, the lens identification information is acquired at the timing (at the time of change) when the interchangeable lens 3 is replaced, and is thus treated as frame meta-information.

The post-stage breathing correction information is information indicating whether or not to execute second post-stage breathing correction to be described below in detail, and is clip meta-information. The meta-information acquisition unit F22 determines whether or not to execute the second post-stage breathing correction on the basis of various kinds of information acquired at the time of capturing the moving image.

The meta-information described here is an example, and it is sufficient that the meta-information includes information for enabling the post-stage breathing correction. Furthermore, only a part of the meta-information described here may be acquired.

[2.5. Internal Breathing Correction]

The meta-information acquisition unit F22 acquires the breathing correction amount (trimming magnification in the present example) for canceling the change in the angle of view as breathing on the basis of the information of the current zoom lens position and focus lens position (of the current frame) transmitted from the interchangeable lens 3 side, and the cam curve table and the breathing correction amount table.

That is, first, the meta-information acquisition unit F22 acquires the current in-focus position on the basis of the current zoom lens position and focus lens position transmitted from the interchangeable lens 3 side and the cam curve table. Then, the meta-information acquisition unit F22 acquires the corresponding breathing correction amount on the basis of the current in-focus position, the current zoom lens position, and the breathing correction amount table.

The internal breathing correction unit F23 instructs the image signal processing unit 58 to acquire information of the trimming magnification as the breathing correction amount acquired by the meta-information acquisition unit F22 as described above, and causes the image signal processing unit 58 to execute the trimming processing for the captured image. As a result, the internal breathing correction by trimming is realized.

In the present embodiment, the table based on the in-focus position is used instead of a table based on the focus lens position. This can reduce data capacity of the breathing correction amount table and improve the accuracy of the breathing correction.

Furthermore, since the characteristics of the change in the angle of view depends on the in-focus position, it is possible to obtain the breathing correction amount with less errors by using the breathing correction amount table based on the in-focus position as described above than a case of using a correction amount table base on the focus lens position.

Therefore, the accuracy of the breathing correction can be improved.

Furthermore, in the present specification, in a case where a configuration in which zoom adjustment is performed by displacement of a plurality of zoom lens groups is adopted, the information of the zoom lens position is combination information of the positions of the respective zoom lens groups.

Similarly, in a case where a configuration in which focus adjustment is performed by displacement of a plurality of focus lens groups is adopted, the information of the focus lens position is combination information of the positions of the respective focus lens groups.

Here, when performing the internal breathing correction by trimming, it should be considered that image quality degradation of the moving image becomes significant when the breathing correction amount (trimming magnification) becomes excessive.

To suppress the image quality degradation due to trimming, for example, it is conceivable to limit the breathing correction amount obtained on the basis of the breathing correction amount table so that the breathing correction amount does not exceed an allowable amount (hereinafter referred to as "allowable correction amount P") determined in advance from the viewpoint of image quality.

In the present embodiment, as a system to limit the breathing correction amount in the internal breathing correction, a limiting system and a proportional system are conceivable.

Figure 12A:
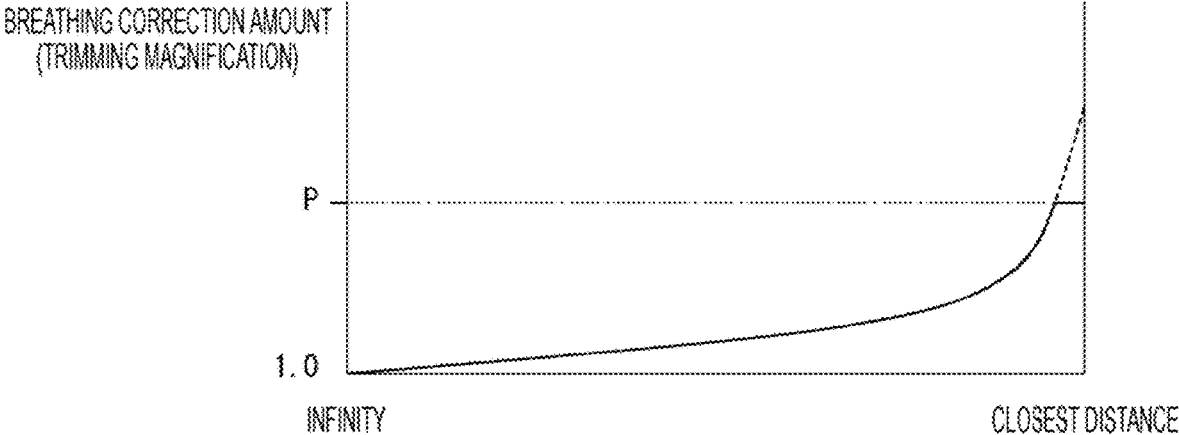
FIG. 12A is a diagram for describing an internal breathing correction amount in a limiting system.
Figure 12B:
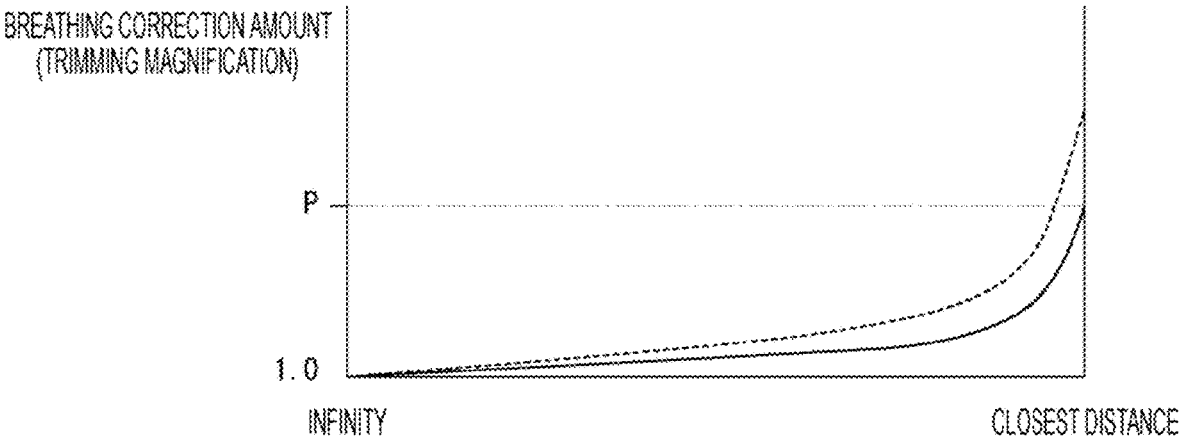
FIG. 12B is a diagram for describing an internal breathing correction amount in a proportional system.

FIG. 12A is a diagram for describing the internal breathing correction amount in the limiting system. FIG. 12B is a diagram for describing an internal breathing correction amount in a proportional system. In FIGS. 12A and 12B, the breathing correction amount (breathing correction amount before the internal breathing correction by the limiting method or the proportional method is performed) obtained on the basis of the breathing correction amount table is indicated by the broken line. Furthermore, in FIG. 12A, the internal breathing correction amount limited by the limiting system is indicated by the solid line. Furthermore, in FIG. 12B, the internal breathing correction amount limited by the proportional system is indicated by the solid line.

In a case where the limiting system is adopted, as illustrated in FIG. 12A, the meta-information acquisition unit F22 sets the breathing correction amount obtained on the basis of the breathing correction amount table as the internal breathing correction amount without limiting the internal breathing correction amount in a case where the breathing correction amount is equal to or less than the allowable correction amount P. On the other hand, the meta-information acquisition unit F22 limits the internal breathing correction amount to the allowable correction amount P in a case where the breathing correction amount exceeds the allowable correction amount P.

As a result, the internal breathing correction amount does not become larger than the allowable correction amount P, so that it is possible to suppress the image quality degradation due to trimming.

However, in the limiting system, when the in-focus position is brought closer, the change in the angle of view suddenly occurs at the in-focus position where the breathing correction amount exceeds the allowable correction amount P. Therefore, the change in the angle of view as breathing is easily recognized by the user.

Therefore, in the proportional method, as illustrated in FIG. 12B, the meta-information acquisition unit F22 calculates the internal breathing correction amount in which the breathing correction amount obtained on the basis of the breathing correction amount table is proportionally limited in the entire range of the in-focus position so that the internal breathing correction amount becomes the allowable correction amount P when the in-focus position is at the closest distance. That is, the meta-information acquisition unit F22 adjusts the breathing correction amount acquired on the basis of the breathing correction amount table so as to realize a correction curve as indicated by the solid line in FIG. 12B.

Thereby, in the proportional method, it is possible to suppress the image quality degradation due to trimming and to suppress a sudden change in the angle of view.

[2.6. Meta-information Associating Processing]

The meta-information associating unit F24 associates the meta-information acquired by the meta-information acquisition unit F22 with the image data. That is, the meta-information associating unit F24 records, in the recording medium 60, the frame meta-information in the meta-information acquired by the meta-information acquisition unit F22 in association with the frame, and records, in the recording medium 60, the clip meta-information in association with the image data. Moreover, the meta-information associating unit F24 records, in the recording medium 60, the lens position information acquired the at sampling intervals in association with an acquired time.

Note that the meta-information associating unit F24 may change (determine) whether or not to associate the meta-information and the meta-information to be associated with on the basis of a relationship of recording speed of the recording medium 60, presence/absence of execution of the internal breathing correction, various settings of the interchangeable lens 3 and the imaging device 2, and the like.

Specifically, since the breathing correction amount cannot be acquired in a case where the table information is not stored in the memory 32 of the interchangeable lens 3, the meta-information associating unit F24 may not associate all the pieces of meta-information. Furthermore, in such a case, the meta-information associating unit F24 may associate the lens position information, the imaging setting information, the imaging element information, and the lens identification information so that the post-stage breathing correction is executable. Thereby, for example, if the table information of the interchangeable lens 3 can be obtained from an outside via a network or the like, the post-stage breathing correction can be performed.

Furthermore, in a case where the internal breathing correction is performed and the internal breathing correction amount is not limited, the post-stage breathing correction does not need to be performed. Therefore, the meta-information associating unit F24 may not associate all the pieces of meta-information.

Furthermore, in a case where the breathing correction amount can be acquired but the internal breathing correction is not performed, the meta-information associating unit F24 may not associate the internal breathing correction amount.

Furthermore, in a case where the imaging element 55 is a CCD sensor or a case where a global shutter is adopted in a CMOS sensor, the second post-stage breathing correction to be described below does not need to be performed. Therefore, the meta-information associating unit F24 may not associate the lens position information acquired at the sampling intervals shorter than a frame period.

Furthermore, in a case where the focus lens position does not change at the time of capturing the moving image, the breathing does not occur. Therefore, the meta-information associating unit F24 may not associate all the pieces of meta-information.

Furthermore, in a case where it is determined that the acquired breathing correction amount hardly changes regardless of the in-focus position, the change in the angle of view due to the breathing hardly occurs, and the breathing correction does not need to be performed. Therefore, the meta-information associating unit F24 may not associate all the pieces of meta-information.

Furthermore, in a case where the F-number is small, background is likely to be blurred and the change in the angle of view due to breathing is difficult to see. Therefore, the meta-information associating unit F24 may not associate all pieces of meta-information or may not associate the lens position information acquired at the sampling intervals shorter than the frame period.

Furthermore, since the meta-information is written to the recording medium 60 together with the image data, in a case where a write amount to the recording medium 60 is close to or exceeds write speed of the recording medium 60, the meta-information associating unit F24 may not associate all the meta-information or may not associate the lens position information acquired at sampling intervals shorter than the frame period.

As described above, the meta-information associating unit F24 may switch (change) the meta-information to be associated with or switch (change) whether or not to associate the meta-information according to various conditions at the time of imaging.

[2.7. Processing Procedure]

Next, a specific processing procedure example for recording, in the recording medium 60, the meta-information in the above-described focus-related processing will be described with reference to a flowchart of FIG. 13.

Figure 13:
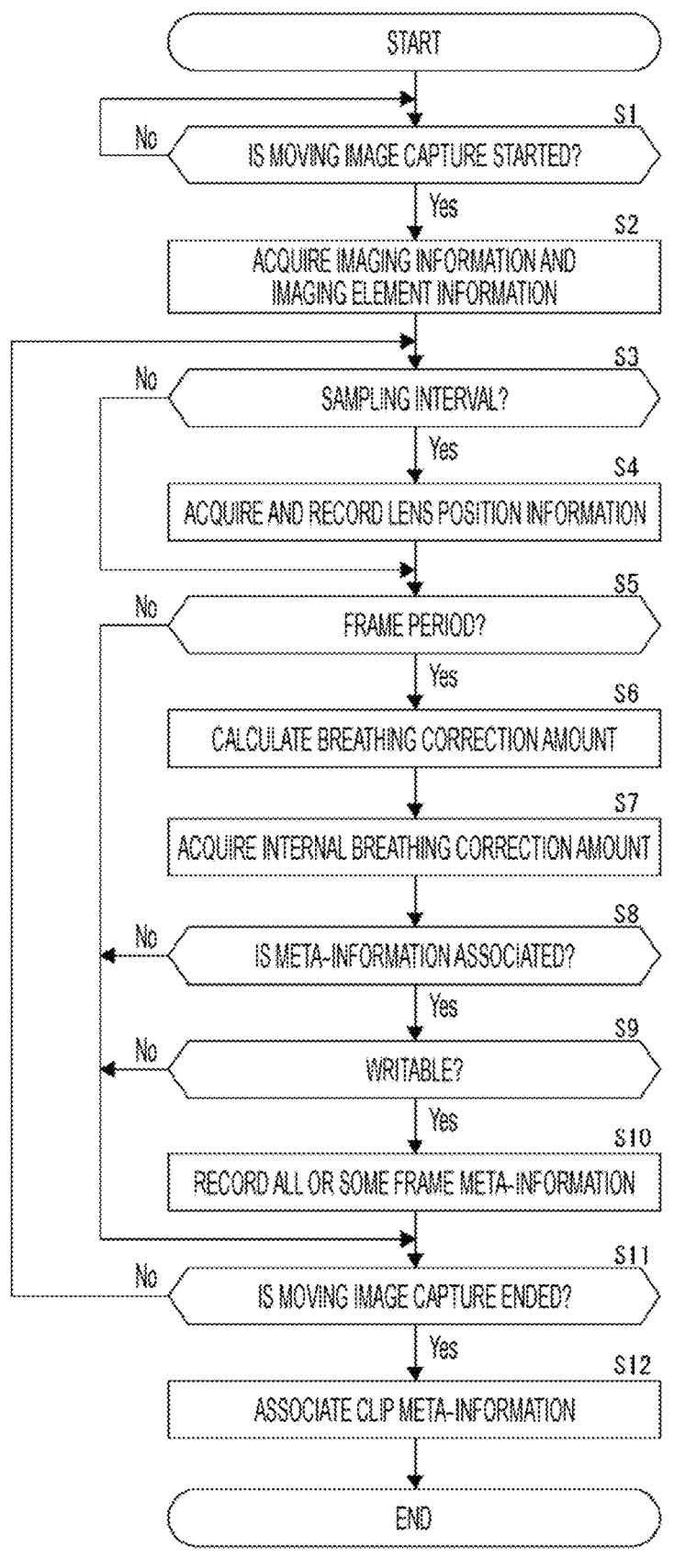
FIG. 13 is a flowchart illustrating a processing procedure of a body-side control unit.

Note that, in the present example, the body-side control unit 52 executes the processing illustrated in FIG. 13 as software processing on the basis of the above-described program stored in the ROM or the like.

First, in step S1, the body-side control unit 52 waits for start of capturing a moving image. That is, processing of waiting for a start state of an imaging operation for the moving image is performed on the basis of the user's operation input or the like.

In a case where it is determined that moving image capture has been started (Yes in step S1), the body-side control unit 52 acquires the imaging setting information and the imaging element information that are part of the clip meta-information in step S2.

In step S3, the body-side control unit 52 determines whether it is the sampling interval on the basis of the exposure time, an imaging cycle, and the like. In a case where it is determined that it is the sampling interval (Yes in step S3), in step S4, the body-side control unit 52 acquires the zoom lens position and the focus lens position detected by the detection unit 17 as lens position information, and records the acquired lens position information in the recording medium 60 in a case where write to the recording medium 60 is possible on the basis of the above-described various conditions.

In step S5, the body-side control unit 52 determines whether it is a predetermined frame period. In a case where it is determined that it is the frame period (Yes in step S5), in step S6, the body-side control unit 52 acquires the in-focus position from the cam curve table on the basis of the zoom lens position and the focus lens position detected by the detection unit 17, and acquires the breathing correction amount from the breathing correction amount table on the basis of the in-focus position and the zoom lens position. Furthermore, in a case where the breathing correction amount is limited, the body-side control unit 52 acquires the internal breathing correction amount, using the limiting system or the proportional system on the basis of the breathing correction amount. Moreover, the body-side control unit 52 acquires the focal length from the focal length table in which breathing is taken into consideration on the basis of the in-focus position and the zoom lens position.

Subsequently, in step S7, the body-side control unit 52 instructs the image signal processing unit 58 to acquire the acquired internal breathing correction amount. Thereby, the internal breathing correction by the trimming correction method is realized.

In step S8, the body-side control unit 52 determines whether or not to associate the meta-information with the image data on the basis of the above-described various conditions. In a case where it is determined to associate the meta-information with the image data (Yes in step S8), the body-side control unit 52 determines whether the meta-information can be written to the recording medium 60 on the basis of the write amount of the image data and the write speed to the recording medium 60 in step S9. In a case where it is determined that the meta-information can be written to the recording medium 60 (Yes in step S9), the body-side control unit 52 records all or part of the frame meta-information in the recording medium 60 in association with the frame on the basis of a record amount of the image data and the write speed to the recording medium 60 in step S10.

In step S11, the body-side control unit 52 waits whether or not the moving image capture ends. That is, the processing waits for the end of the imaging operation for the moving image. In a case where it is determined that the moving image capture does not end (No in step S11), the body-side control unit 52 returns to step S3. On the other hand, in a case where it is determined that the moving image capture has ended (Yes in step S11), the body-side control unit 52 calculates the clip meta-information and records the clip meta-information in the recording medium 60 in association with the image data.

As described above, the imaging device 2 acquires the breathing correction amount on the basis of the table information stored in the interchangeable lens 3 and associates the acquired breathing correction amount with the image data as the meta-information regardless of the presence or absence of execution of the internal breathing correction. As a result, the computer 4 that has acquired the meta-information together with the image data can perform the post-stage breathing correction for the image data (moving image) on the basis of the acquired meta-information.

3. Computer

[3.1. Configuration of Computer]

Next, the computer 4 that performs the post-stage breathing correction for the moving image on the basis of the image data and the meta-information acquired by the imaging device 2 will be described.

Figure 14:
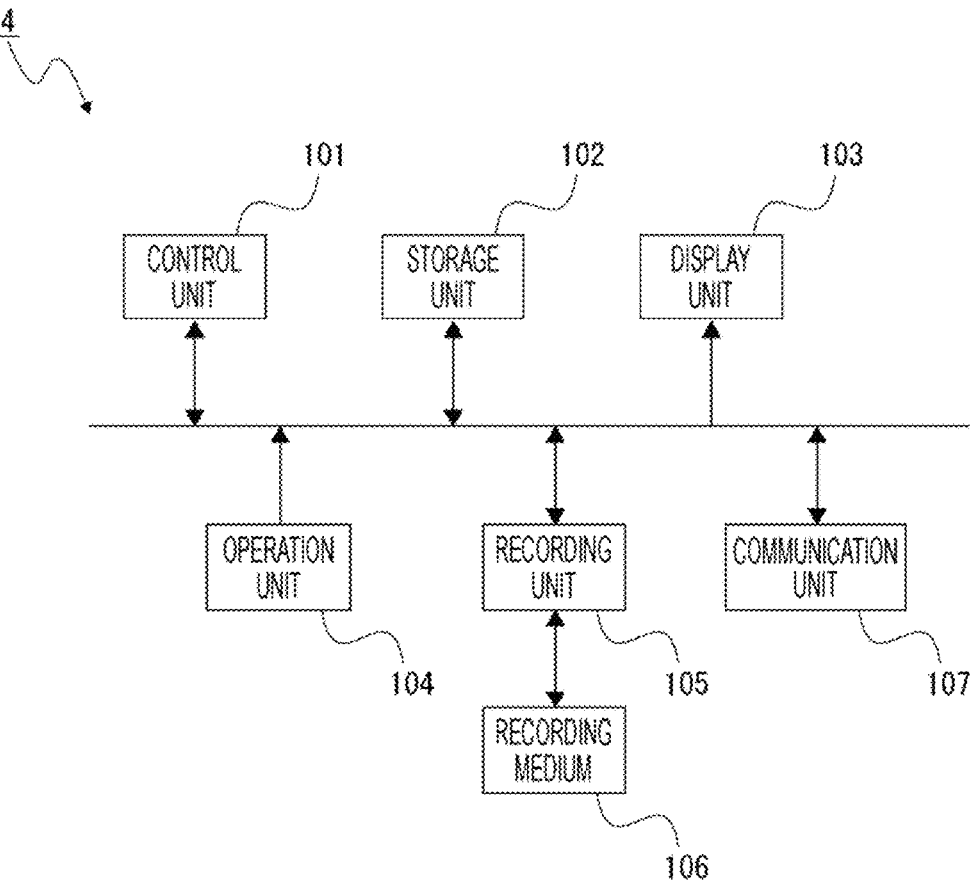
FIG. 14 is a block diagram illustrating a configuration of a computer.

FIG. 14 is a block diagram illustrating a configuration of the computer 4. As illustrated in FIG. 14, the computer 4 includes a control unit 101, a storage unit 102, a display unit 103, an operation unit 104, a recording unit 105, a recording medium 106, and a communication unit 107.

The control unit 101 includes, for example, a microcomputer including a CPU, a ROM, a RAM, and the like, and performs overall control of the computer 4 by the CPU reading a program stored in a predetermined storage device such as the ROM or the storage unit 102 into the RAM and executing the program.

The storage unit 102 includes, for example, a storage medium such as a solid-state memory. The storage unit 102 can store various types of information. Furthermore, the storage unit 102 can also be used for storing program data for the control unit 101 to execute various types of processing.

The display unit 103 is a liquid crystal display, an organic EL display, or the like, and displays various screens (images).

The operation unit 104 is an input device used by the user, and is, for example, various operators and operation devices such as a keyboard, a mouse, a button, a dial, a touch pad, and a touch panel. When a user operation is detected by the operation unit 104, a signal corresponding to the input operation is input to the control unit 101.

The recording medium 106 includes a non-volatile memory, and the recording unit 105 is configured to be able to write data to the recording medium 106 and read data recorded in the recording medium 106. Here, the recording medium 106 may be detachable from the computer 4.

The communication unit 107 performs wired or wireless communication with the imaging device 2, for example.

Figure 15:
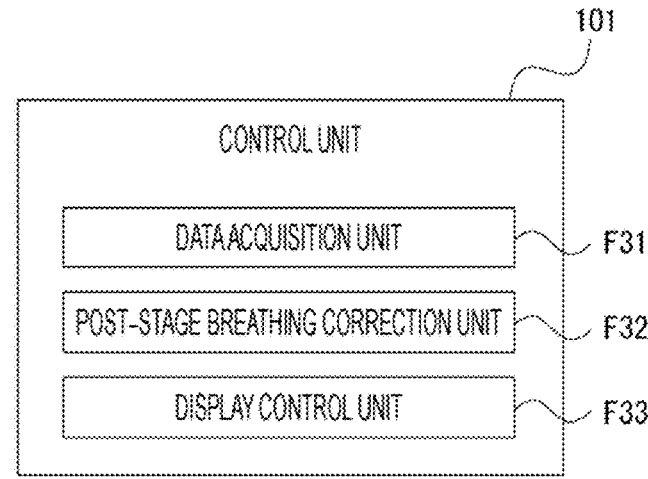
FIG. 15 is a functional block diagram of a control unit.

FIG. 15 is a functional block diagram of a control unit 101. As illustrated in FIG. 15, the control unit 101 functions as a data acquisition unit F31, a post-stage breathing correction unit F32, and a display control unit F33.

The data acquisition unit F31 acquires the image data and the meta-information generated by the imaging device 2. In a case where the recording medium 60 of the imaging device 2 is attached to the computer 4 as the recording medium 106, the data acquisition unit F31 acquires the image data and the meta-information from the recording medium 106 via the recording unit 105. Furthermore, the data acquisition unit F31 may acquire the image data and the meta-information by communicating with the imaging device 2 via the communication unit 107.

The post-stage breathing correction unit F32 performs the post-stage breathing correction for the moving image based on the image data acquired by the data acquisition unit F31 on the basis of the meta-information acquired by the data acquisition unit F31.

The display control unit F33 controls a screen (UI) displayed on the display unit 103 when the post-stage breathing correction is performed by the post-stage breathing correction unit F32.

[3.2. Post-Stage Breathing Correction]

Next, the post-stage breathing correction will be described. The post-stage breathing correction includes a first post-stage breathing correction that performs the breathing correction with a uniform breathing correction amount for each frame constituting the moving image, and a second post-stage breathing correction that performs the breathing correction with a different breathing correction amount according to the line for each frame constituting the moving image.

In the first post-stage breathing correction, since the breathing correction is performed with a uniform breathing correction amount for each frame, the correction can be performed at high speed with a low processing load. Therefore, the computer 4 is also used when a preview display is performed to show an outline of the post-stage breathing correction to the user.

On the other hand, in the second post-stage breathing correction, the breathing correction amount is calculated for each line in each frame and the correction is performed. Therefore, the correction can be performed with high accuracy.

The post-stage breathing correction unit F32 performs the post-stage breathing correction for the moving image by the post-stage breathing correction selected by the user or the post-stage breathing correction automatically selected.

Specifically, the post-stage breathing correction unit F32 performs the first post-stage breathing correction in a case where the post-stage breathing correction information included in the meta-information indicates that the second post-stage breathing correction is not executable.

Furthermore, in a case where any one of the table information, the lens position information, the imaging setting information, and the imaging element information acquired at the sampling intervals cannot be acquired, the post-stage breathing correction unit F32 cannot perform the second post-stage breathing correction, and thus performs the first post-stage breathing correction.

Furthermore, in a case where the F-number included in the imaging setting information is small, the background is likely to blur, and the change in the angle of view due to breathing is difficult to see. Therefore, the post-stage breathing correction unit F32 performs the first post-stage breathing correction.

Furthermore, in a case where the focus lens position indicated by the lens position information hardly fluctuates, the breathing does not occur. Therefore, the post-stage breathing correction unit F32 performs the first post-stage breathing correction.

Furthermore, in a case where the focus lens position indicated by the lens position information greatly fluctuates, there is a high possibility that a different change in the angle of view occurs for each line. Therefore, the post-stage breathing correction unit F32 performs the second post-stage breathing correction.

Furthermore, in a case where the readout time included in the imaging element information is long, there is a high possibility that a different change in the angle of view occurs for each line, and thus the post-stage breathing correction unit F32 performs the second post-stage breathing correction.

Furthermore, in a case where the breathing correction amount indicated in the table information I2 (lens information) is large, there is a high possibility that a different change in the angle of view occurs for each line, and thus the post-stage breathing correction unit F32 performs the second post-stage breathing correction.

As described above, the post-stage breathing correction unit F32 may switch (change) the post-stage breathing correction to be executed on the basis of various types of information included in the meta-information. Furthermore, the display control unit F33 may determine the recommended post-stage breathing correction similarly to the case of switching the post-stage breathing correction executed by the post-stage breathing correction unit F32, and suggest the determined post-stage breathing correction to the user. As a result, the user can know which post-stage breathing correction is better to perform.

Next, regarding the first post-stage breathing correction and the second post-stage breathing correction, a case where the correction is performed for the moving image on which the internal breathing correction has not been performed will be described, and then a case where the internal breathing correction has been performed will be described. Furthermore, here, a case where the imaging element 55 is a CMOS sensor and the moving image is captured by a rolling shutter will be described. Moreover, here, a case where the post-stage breathing correction is performed for the entire moving image based on the image data will be described. However, the post-stage breathing correction may be performed only for a part of the range to be corrected specified by the user, for example, in the entire moving image based on the image data.

[3.2.1. First Post-Stage Breathing Correction]

Figure 16:
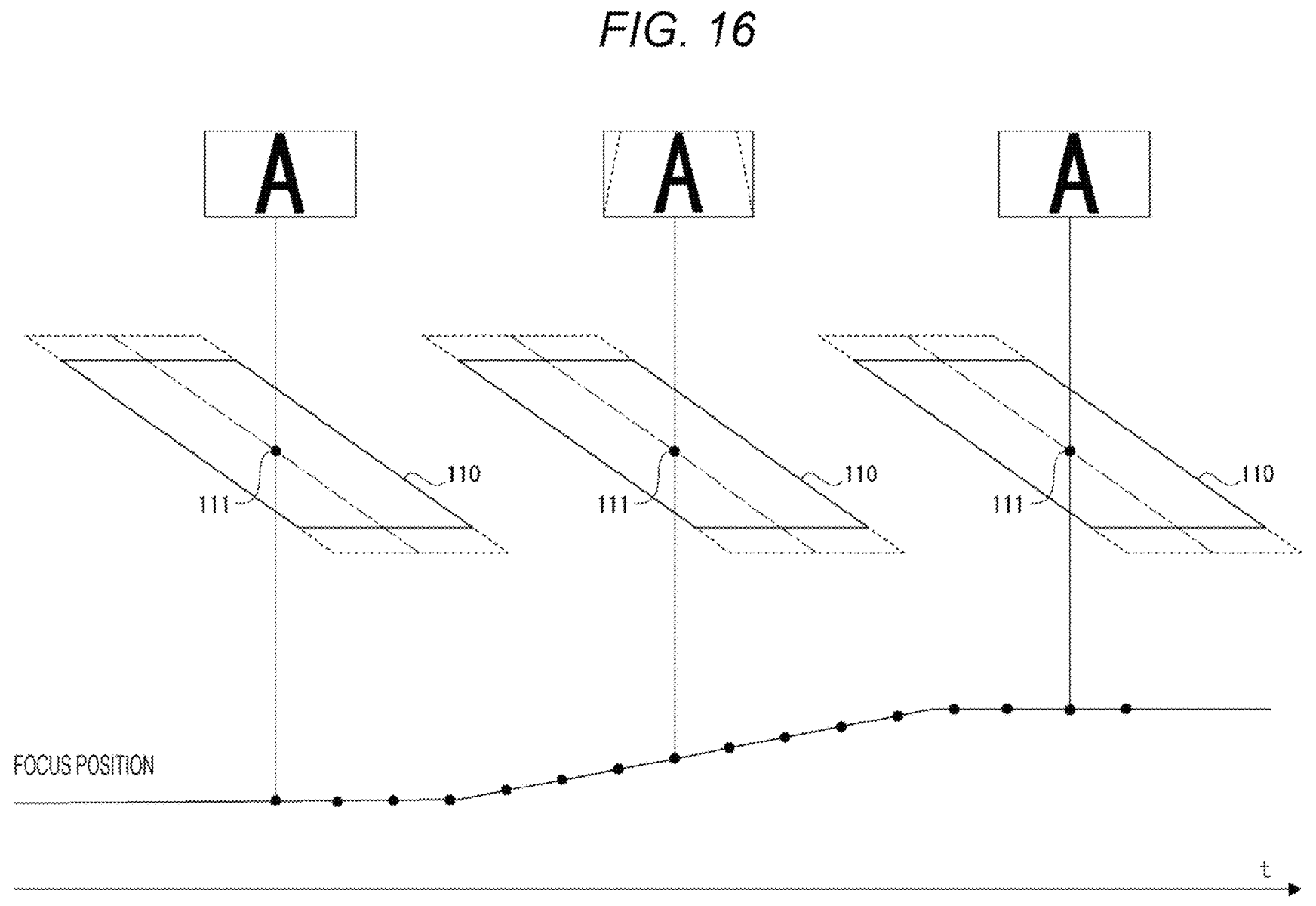

FIG. 16 is a diagram for describing the first post-stage breathing correction. As illustrated in FIG. 16, in the first post-stage breathing correction, the post-stage breathing correction unit F32 obtains the breathing correction amount at an exposure center of gravity 111 of each frame on the basis of the meta-information, and performs the post-stage breathing correction corresponding to the obtained breathing correction amount for the frame.

Here, the post-stage breathing correction unit F32 may obtain the breathing correction amount on the basis of the breathing correction amount information included in the meta-information. That is, the post-stage breathing correction unit F32 may use the breathing correction amount for each frame obtained by the imaging device 2 as it is as the breathing correction amount.

Furthermore, the post-stage breathing correction unit F32 may obtain the breathing correction amount on the basis of the lens position information and the table information included in the meta-information. In this case, the post-stage breathing correction unit F32 may obtain the breathing correction amount from the focus lens position and the zoom lens position indicated by the lens position information with reference to the cam curve table and the breathing correction amount table indicated by the table information.

Furthermore, in a case where the lens position information included in the meta-information is acquired at each sampling interval, the post-stage breathing correction unit F32 obtains the exposure center of gravity 111 of each frame on the basis of the imaging setting information and the imaging element information included in the meta-information. After obtaining the focus lens position and the zoom lens position at the exposure center of gravity 111, the post-stage breathing correction unit F32 may then obtain the breathing correction amount on the basis of the table information.

Figure 17:
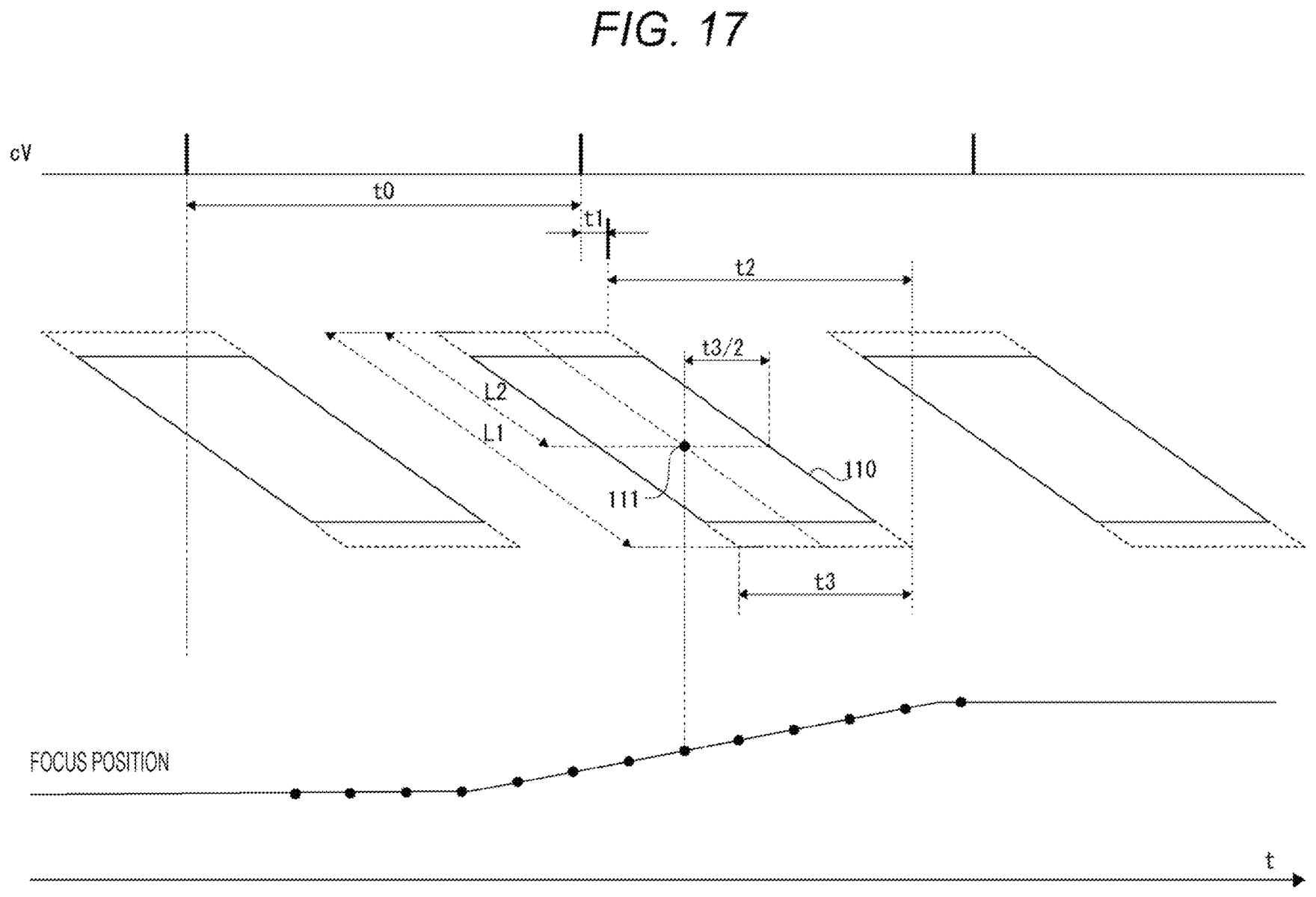

FIG. 17 is a diagram for describing the exposure center of gravity 111. FIG. 17 illustrates a vertical synchronization signal cV of the imaging device 2 and an exposure timing range 110. The exposure timing range 110 schematically indicates, in a parallelogram, an exposure period of each line of one frame when the exposure time t3 is set by the rolling shutter method. The solid line portion in the exposure timing range 110 corresponds to the imaging area and is an area that is actually read as the image data. The broken line portion in the exposure timing range 110 corresponds to, for example, optical black (OPB) or the like and is an area that does not become the image data.

Furthermore, FIG. 17 illustrates image period to, readout start time t1, readout time t2, and exposure time t3. Note that the readout start time t1 is a time based on the vertical synchronization signal cV.

Then, the post-stage breathing correction unit F32 calculates the exposure center of gravity 111 of each frame by the following expression (1).

The exposure center of gravity 111=the image period $t0$+the readout start time $t1$+a center line position $L2$ in a longitudinal direction (vertical direction) of the imaging area/the number of readout lines $L1$×the readout time $t2$−the exposure time $t3/2$    (1)

When the exposure center of gravity 111 is calculated, the post-stage breathing correction unit F32 obtains the focus lens position and the zoom lens position at the calculated exposure center of gravity 111 on the basis of the lens position information acquired at the sampling intervals (only focus positions are illustrated). The post-stage breathing correction unit F32 obtains the breathing correction amount on the basis of the obtained focus lens position and zoom lens position and the table information (cam curve table and breathing correction amount table). Note that the focus lens position and the zoom lens position indicated in the lens position information acquired at the sampling intervals are used by being interpolated by linear interpolation, or the like, for example.

Figure 18A:
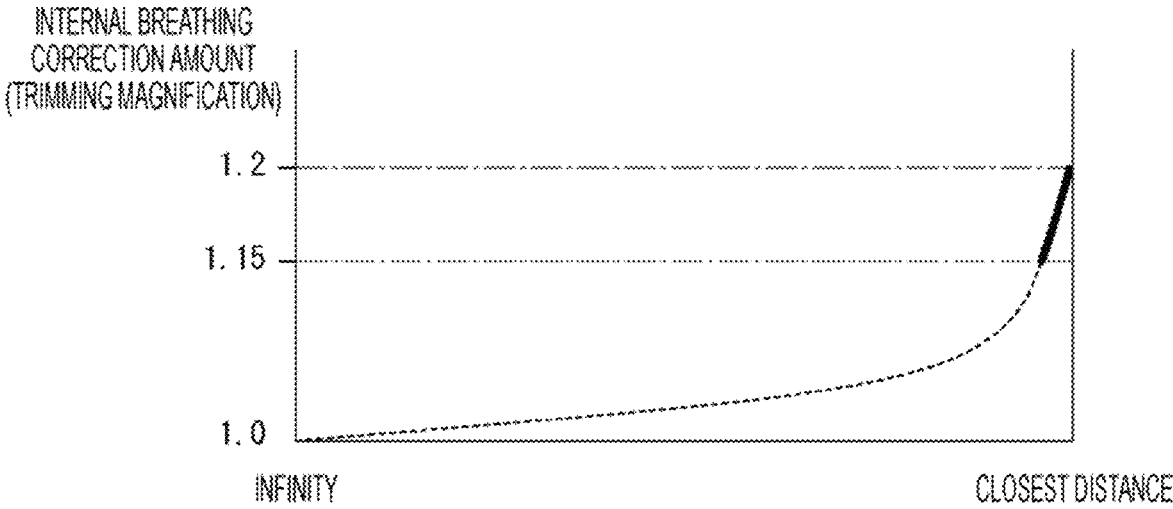
FIG. 18A is a diagram for describing a breathing correction amount in internal breathing correction.
Figure 18B:
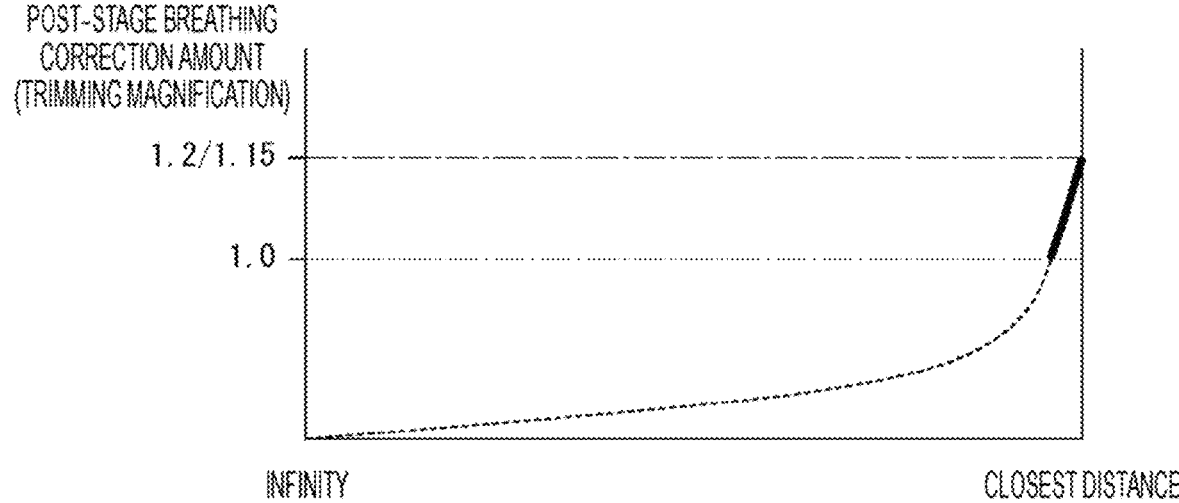
FIG. 18B is a diagram for describing a breathing correction amount in the first post-stage breathing correction.

FIG. 18A is a diagram for describing the breathing correction amount in the internal breathing correction. FIG. 18B is a diagram for describing a breathing correction amount in the first post-stage breathing correction.

Here, as described above, in the imaging device 2, the internal breathing correction may be simultaneously performed with the imaging of the moving image, and at that time, it is unclear to which position the focus lens 16 moves. Therefore, as illustrated in FIG. 18A, the internal breathing correction amount (trimming magnification) is set to be "1.0" at infinity. Therefore, for example, as indicated by the solid line in FIG. 18A, even in a case where the focus lens 16 moves only in a range where the internal breathing correction amount is 1.15 times to 1.2 times, the trimming (cutting out) is performed at the trimming magnification of 1.15 times to 1.2 times in the internal breathing correction.

Therefore, in the internal breathing correction, the image quality deterioration is likely to occur.

Therefore, in the first post-stage breathing correction, the post-stage breathing correction unit F32 extracts the breathing correction amount that is the minimum value in the breathing correction amounts obtained for the respective frames. Note that the breathing correction amount that is the minimum value may be extracted from the breathing correction amount minimum value maximum value information included in the meta-information.

Thereafter, as illustrated in FIG. 18B, the post-stage breathing correction unit F32 sets a value obtained by dividing the breathing correction amount of each frame by the breathing correction amount that is the minimum value as the post-stage breathing correction amount. Then, the post-stage breathing correction unit F32 performs the post-stage breathing correction according to the post-stage breathing correction amount obtained for each frame.

As a result, in the first post-stage breathing correction, the post-stage breathing correction amount can be used by setting the minimum value of the breathing correction amount in the moving image to 1.0 times, so that the image quality deterioration can be reduced.

[3.2.2. Second Post-Stage Breathing Correction]

Figure 19:
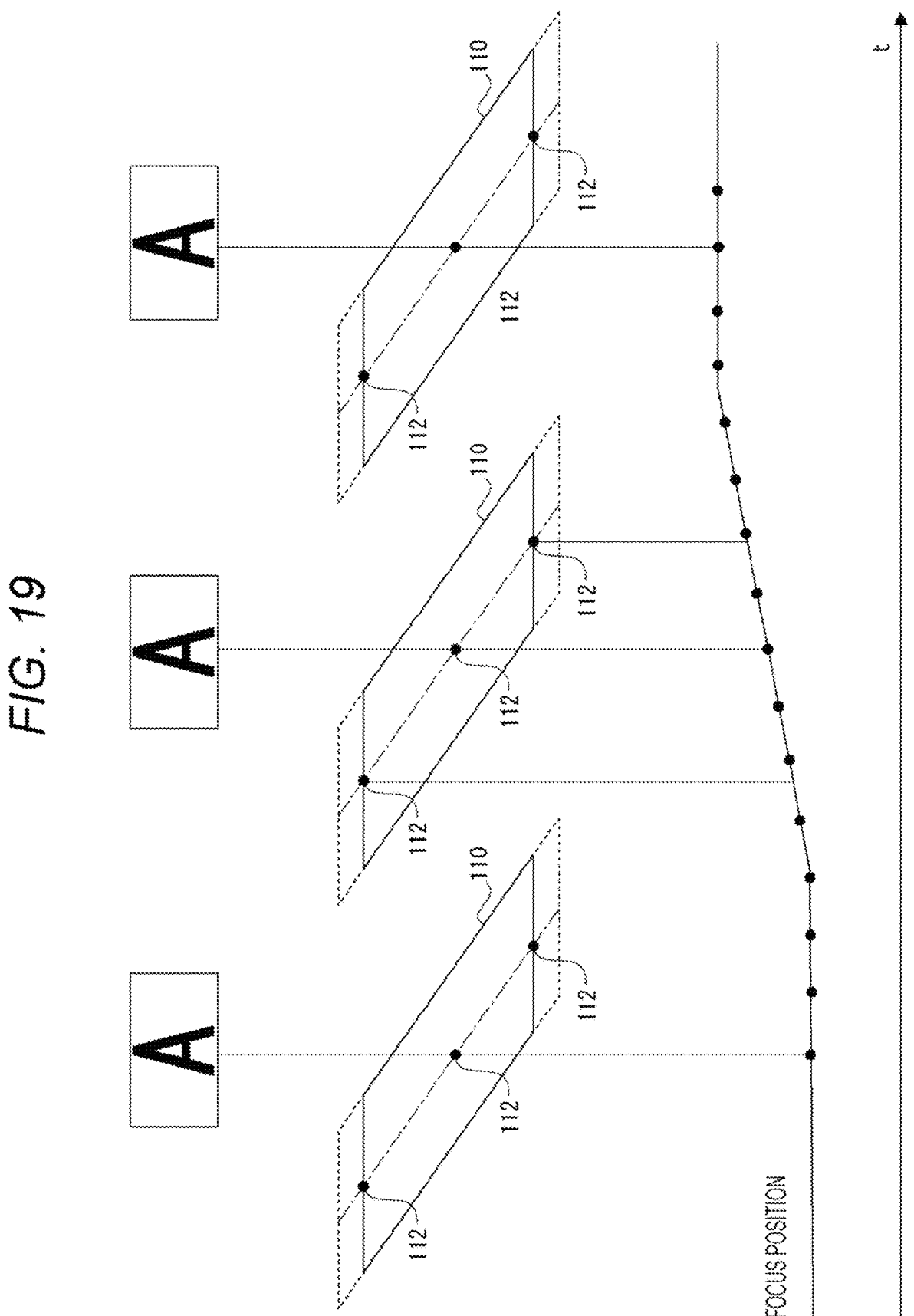
FIG. 19 is a diagram for describing a second post-stage breathing correction.

FIG. 19 is a diagram for describing the second post-stage breathing correction. In the first post-stage breathing correction, as illustrated in FIG. 16, the breathing correction is performed with the same post-stage breathing correction amount for each frame. Then, in a case where the imaging device 2 employs the so-called rolling shutter and the focus lens 16 moves while imaging one frame, the change in the angle of view may occur in one frame, and the image may be distorted when the first post-stage breathing correction is performed.

Therefore, in the second post-stage breathing correction, the breathing correction amount for each line (horizontal line) constituting the frame is calculated, and the breathing correction is performed with the post-stage breathing correction amount different for each line, thereby reducing the distortion of the image.

Specifically, as illustrated in FIG. 19, the post-stage breathing correction unit F32 obtains an exposure center of gravity 112 of each line (in the drawing, only a top line, a center line, and a bottom line are illustrated) in the imaging area on the basis of the imaging setting information and the imaging element information included in the meta-information. Note that a method of obtaining the exposure center of gravity 112 is similar to that of the exposure center of gravity 111, and thus description thereof will be omitted.

When the exposure center of gravity 112 is obtained for each line in this manner, the post-stage breathing correction unit F32 obtains the focus lens position and the zoom lens position at the exposure center of gravity 112 on the basis of the lens position information acquired at the sampling intervals (only focus positions are illustrated). The post-stage breathing correction unit F32 obtains the breathing correction amount on the basis of the obtained focus lens position and zoom lens position and the table information (cam curve table and breathing correction amount table). That is, the post-stage breathing correction unit F32 obtains the breathing correction amount for each line.

Thereafter, in the second post-stage breathing correction, the post-stage breathing correction unit F32 extracts the breathing correction amount that is the minimum value in the breathing correction amounts obtained for the respective line in each frame. Then, the post-stage breathing correction unit F32 calculates a value obtained by dividing the breathing correction amount for each line of each frame by the breathing correction amount that is the minimum value as the post-stage breathing correction amount.

When the post-stage breathing correction amount is obtained, the post-stage breathing correction unit F32 performs the post-stage breathing correction for the moving image. Here, for each frame, trimming is performed by enlarging the image according to the post-stage breathing correction amount for each line and then cutting out the image with reference to the center position of the image.

Thereby, in the second post-stage breathing correction, even in a case where the imaging device 2 employs the so-called rolling shutter and the focus lens 16 moves while imaging one frame, it is possible to reduce the image distortion due to the breathing correction.

[3.2.3. Post-Stage Breathing Correction After Internal Breathing Correction]

Next, a method of processing the post-stage breathing correction for the moving image for which the internal breathing correction has been performed will be described. Here, two processing methods will be described. The above-described post-stage breathing correction amount is a correction amount when the breathing correction is performed for the moving image (frame) for which the internal breathing correction has not been performed. Therefore, in a case where the internal breathing correction has been performed, it is necessary to perform the post-stage breathing correction in consideration of the internal breathing correction amount by the internal breathing correction.

FIG. 20 is a diagram for describing an example of a method of processing the post-stage breathing correction. The upper row of FIG. 20 illustrates an image (frame) obtained by imaging by the imaging element 55. In a case where the internal breathing correction has been performed, the image is cut out according to the internal breathing correction amount as illustrated in the second row of FIG. 20. Then, the cutout image is sent to the computer 4 as the image data.

Therefore, first, the post-stage breathing correction unit F32 inversely converts (reduces) the cutout image as illustrated in the third row of FIG. 20, using a reciprocal of the internal breathing correction amount indicated in the internal breathing correction information. Note that, since the size itself of the image is not changed when the image is reduced, an image end portion that is not included in the original image is in black, for example.

Thereafter, as illustrated in the lower row of FIG. 20, the post-stage breathing correction unit F32 performs the post-stage breathing correction for the reduced image, using the obtained post-stage breathing correction amount (cuts out the image). Thereby, the post-stage breathing correction can be performed with an arbitrary correction amount in the post-stage breathing correction.

Note that, in a case where the internal breathing correction amount is larger than the post-stage breathing correction amount, a black image portion remains at the image end. Therefore, the post-stage breathing correction unit F32 calculates a value obtained by dividing the post-stage breathing correction amount by the internal breathing correction amount for all the frames, and uses a value obtained by multiplying the post-stage breathing correction amount by the reciprocal of the minimum value as the post-stage breathing correction amount in a case where the minimum value of the calculated value is less than 1.

Accordingly, even in a case where the internal breathing correction amount is larger than the post-stage breathing correction amount, it is possible to prevent a black image portion from remaining at the image end.

FIG. 21 is a diagram for describing another example of the method of processing the post-stage breathing correction. As illustrated in FIG. 21, the post-stage breathing correction unit F32 calculates a value obtained by dividing the post-stage breathing correction amount by the internal breathing correction amount for all the frames, and uses the calculated value as the post-stage breathing correction amount. Thereby, an image similar to the example illustrated in FIG. 20 can be generated.

Note that in a case where the minimum value of the value obtained by dividing the post-stage breathing correction amount by the internal breathing correction amount is less than 1, a value obtained by multiplying the post-stage breathing correction amount by the reciprocal of the minimum value may be used as the post-stage breathing correction amount as in the example illustrated in FIG. 20.

[3.3. UI Screen of Post-Stage Breathing Correction]

Next, a UI screen 130 displayed on the display unit 103 when the post-stage breathing correction is performed will be described.

Figure 22:
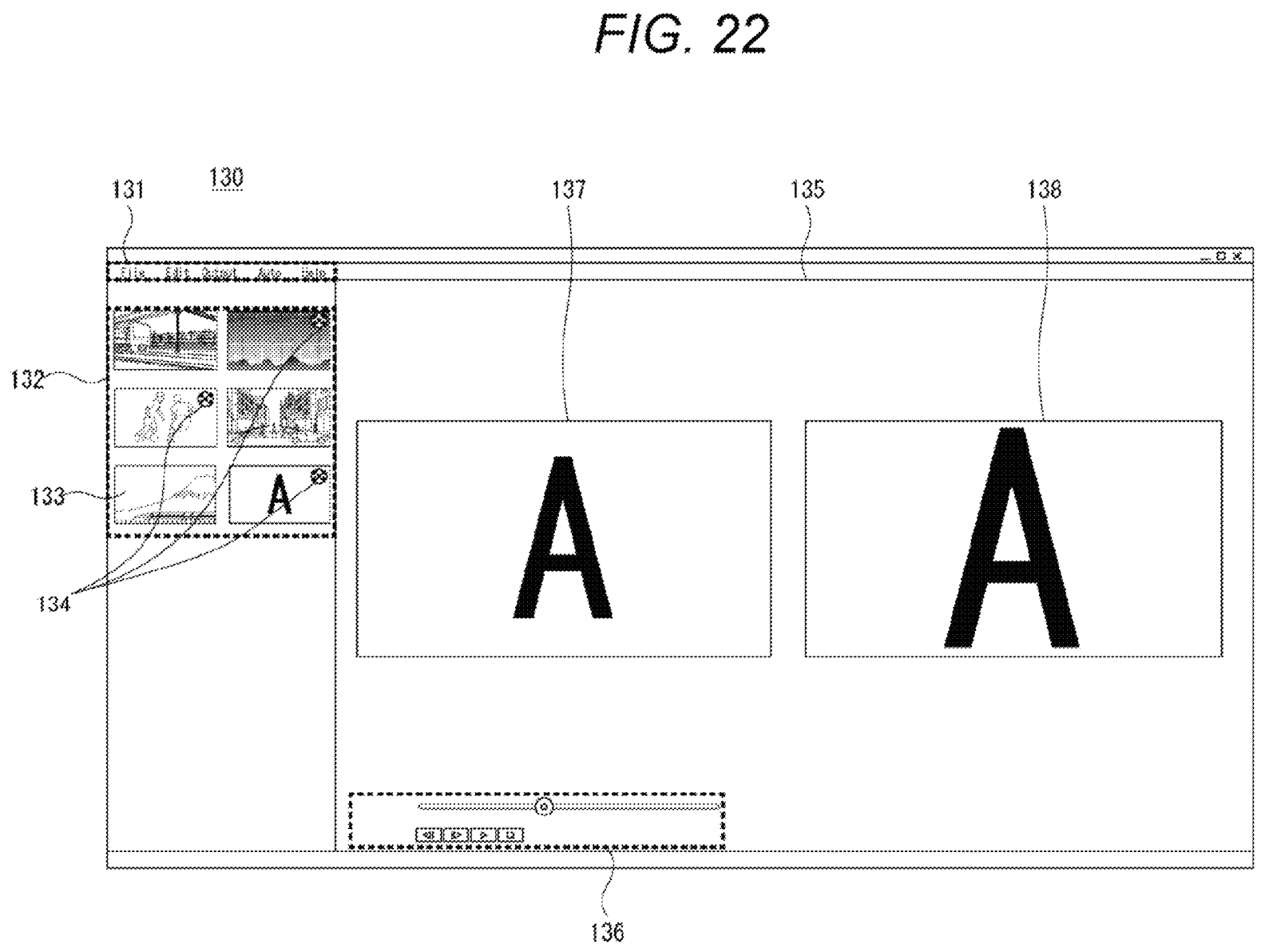

FIG. 22 is a diagram for describing an example of the UI screen 130. When performing the post-stage breathing correction, the display control unit F33 displays the UI screen 130 as illustrated in FIG. 22 on the display unit 103.

On the UI screen 130, a menu part 131 is provided on the upper left of the screen, and operators such as "File", "Edit", "Output", and "Help" are prepared. As a result, various editing operations such as selection and saving of an image file, output setting, help display, and the like can also be performed from the menu part 131.

Furthermore, a list part 132 is provided on the left side of the UI screen 130. The list part 132 displays a list of thumbnail images 133 of the image data recorded in the storage unit 102 or the recording medium 106.

Then, the display control unit F33 superimposes and displays an icon 134 indicating that the post-stage breathing correction is executable on, for example, the upper right of the thumbnail image 133 corresponding to the image data for which the post-stage breathing correction is executable in the thumbnail images 133.

Here, the display control unit F33 displays the icon 134 on the basis of, for example, the post-stage breathing correction information included in the meta-information.

Furthermore, a work area 135 is provided on the right side of the UI screen 130. In the work area 135, the moving image based on the image data to be processed can be displayed, and a slide bar and a playback operator are displayed as a bar/playback operator display unit 136.

The slide bar represents a time axis of the moving image to be processed, and the user can perform an operation such as moving a pointer on the slide bar.

Furthermore, as the playback operator, a playback operation, a stop operation, a frame forward operation, or a frame backward operation can be performed.

Here, the display control unit F33 can display a moving image 137 based on the image data and a moving image 138 after the post-stage breathing correction is performed side by side in the work area 135.

Then, when the user operates the slide bar, images at the same time are displayed side by side as the moving image 137 and the moving image 138 according to the user operation.

Thereby, the user can compare and view the images before and after the post-stage breathing correction, and can confirm the change in the angle of view due to the post-stage breathing correction.

Figure 23:
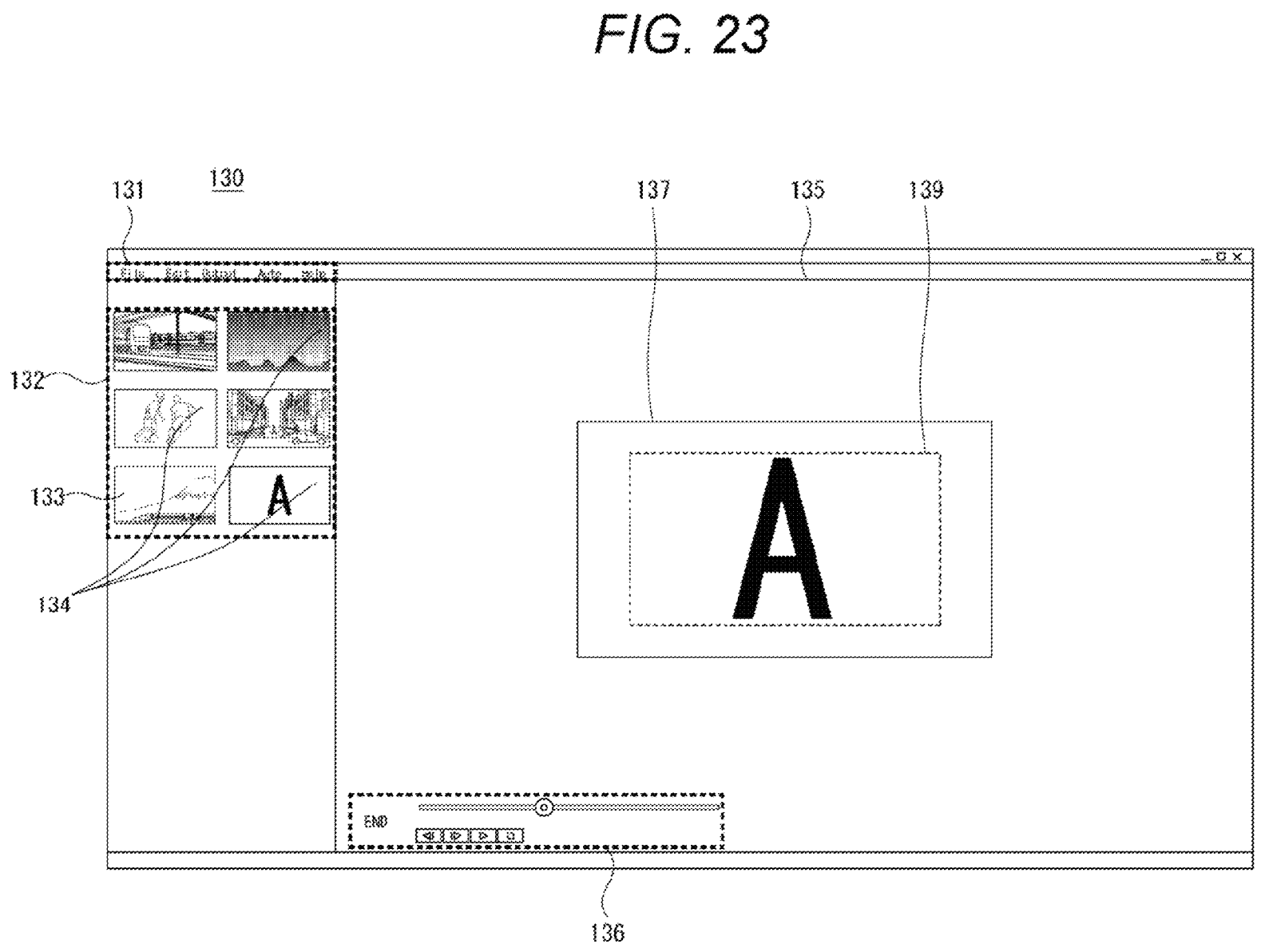

FIG. 23 is a diagram for describing another example of the UI screen 130. Note that, in FIG. 23, the same components as those in FIG. 22 are denoted by the same reference numerals, and description thereof is omitted.

In the example illustrated in FIG. 23, in the work area 135, the moving image 137 based on the image data to be processed is displayed, and a cutout frame 139 indicating an area to be cut out by performing the post-stage breathing correction is displayed in superposition with the moving image 137.

As a result, the user can easily grasp the image to be cut out in the post-stage breathing correction.

Figure 24:
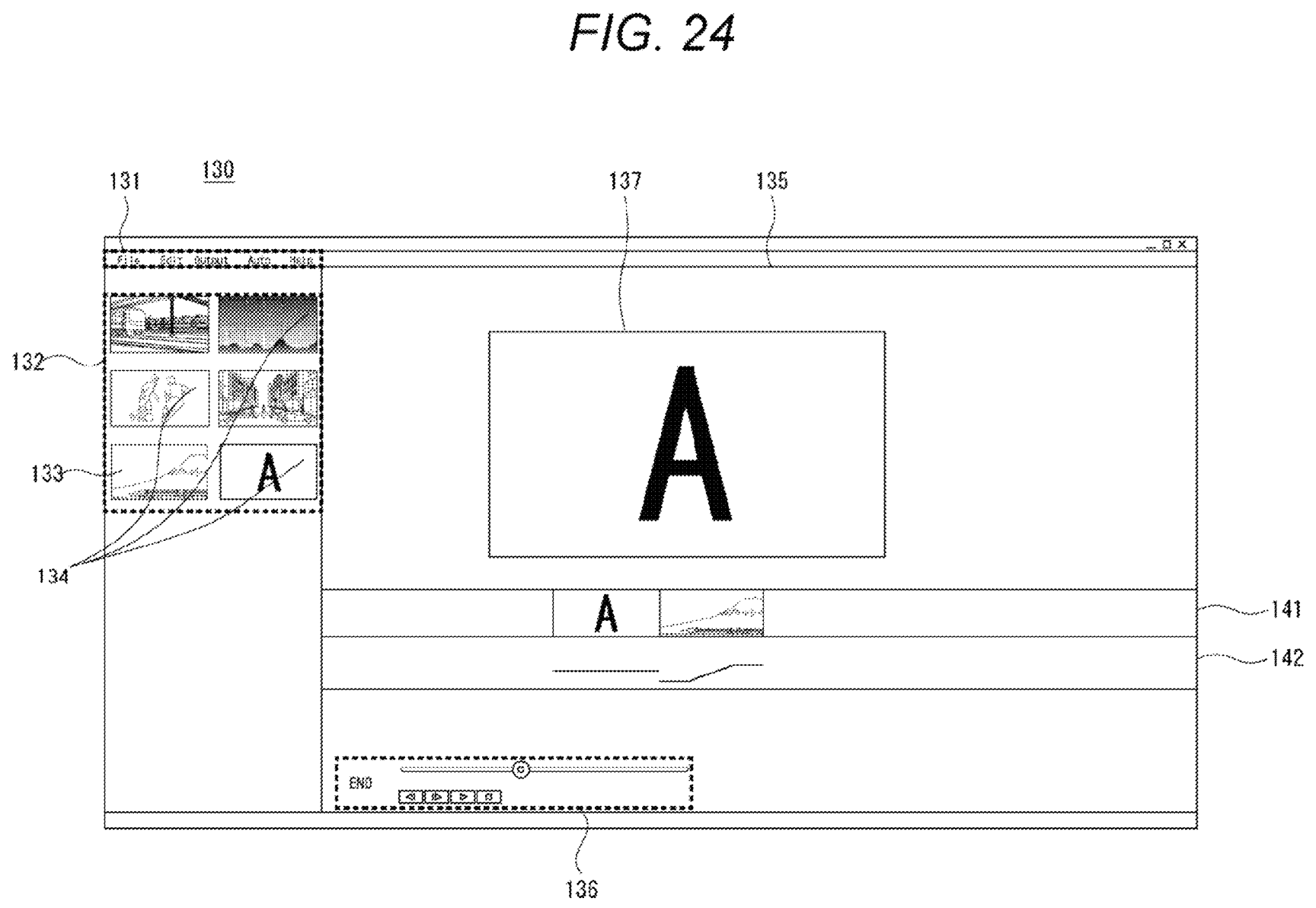

FIG. 24 is a diagram for describing another example of the UI screen 130. Note that, in FIG. 24, the same components as those in FIGS. 22 and 23 are denoted by the same reference numerals, and description thereof is omitted.

In FIG. 24, a timeline display area 141 is provided in the work area 135, and a focal length display area 142 is provided below the timeline display area 141.

For example, when the thumbnail image 133 is dropped in the timeline display area 141 in response to the user operation, the thumbnail image 133 is displayed on the timeline display area 141. In the example of FIG. 24, two thumbnail images 133 are displayed on the timeline display area 141.

The display control unit F33 displays the focal length of the image data in the focal length display area 142 along a time axis on the basis of the focal length information included in the meta-information associated with the image data corresponding to the thumbnail image 133 displayed in the timeline display area 141. The focal length displayed here corresponds to the angle of view of the image.

Then, in a case where the post-stage breathing correction is performed for the image data (moving image), the Display control unit F33 calculates the focal length corresponding to the angle of view of the corrected image on the basis of the post-stage breathing correction amount.

In this way, for example, the user can change the post-stage breathing correction amount so that the focal lengths (angles of view) of the image data arranged in a front-rear direction on the timeline display area 141 are connected.

Figure 25:
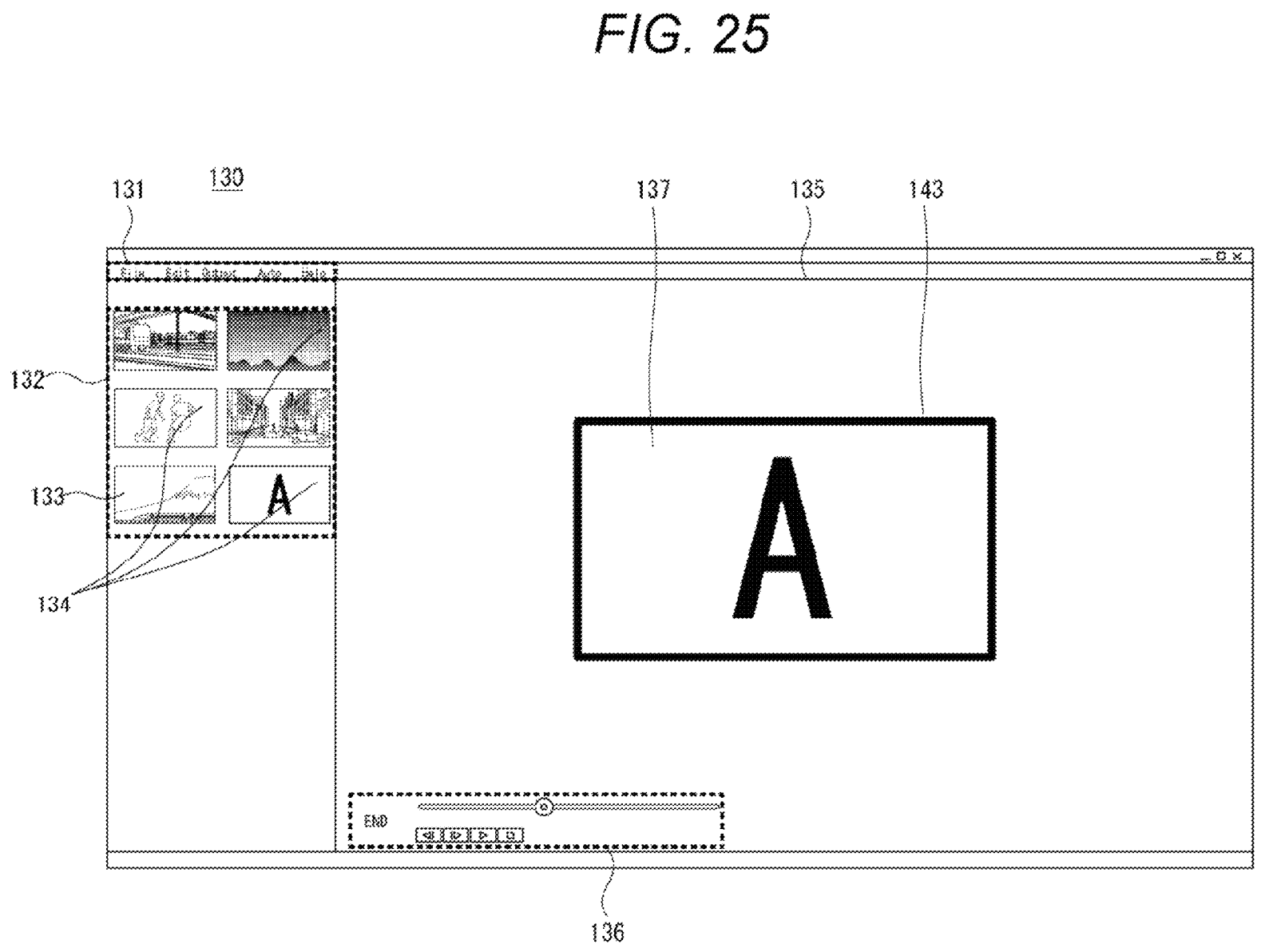

FIG. 25 is a diagram for describing another example of the UI screen 130. Note that, in FIG. 25, the same components as those in FIGS. 22 to 24 are denoted by the same reference numerals, and description thereof is omitted.

As illustrated in FIG. 25, it is assumed that the moving image 137 based on the image data is displayed in the work area 135 on the UI screen 130. It is assumed that the moving image 137 is subjected to the internal breathing correction in the imaging device 2 and is limited in the internal breathing correction.

As described above, in a case where the limitation is applied in the internal breathing correction in the imaging device 2, for example, the display control unit F33 specifies the frame to which the limitation is applied on the basis of the internal breathing correction information included in the meta-information.

Then, when the specified frame is reproduced, the display control unit F33 displays a notification frame 143 indicating that the limitation has been applied in the internal breathing correction to surround the moving image.

As a result, the user can easily grasp the frame limited in the internal breathing correction.

[3.4. Processing Procedure]

Next, a specific processing procedure example regarding the above-described post-stage breathing correction will be described with reference to a flowchart of FIG. 26. Note that, here, a case where the first post-stage breathing correction is performed first and then preview is displayed for the user (review display), and then the post-stage breathing correction is adjusted will be described.

Figure 26:
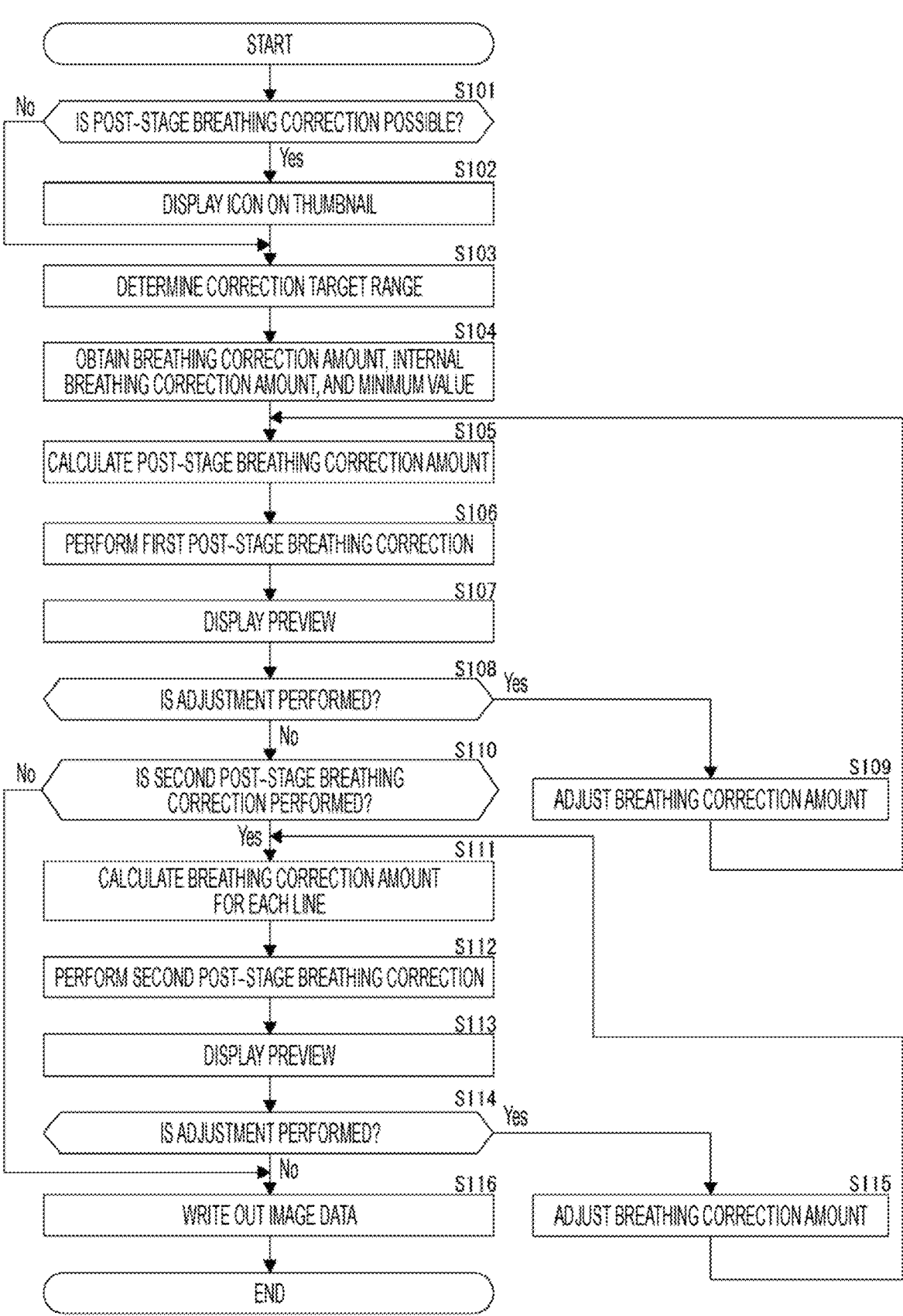
FIG. 26 is a flowchart illustrating a processing procedure of the control unit.

Note that, in the present example, the processing illustrated in FIG. 26 is executed as software processing by the control unit 101 on the basis of the program stored in the ROM, the storage unit 102, or the like described above.

First, in step S101, the control unit 101 determines whether or not the post-stage breathing correction is executable for the image data corresponding to the thumbnail image 133 displayed on the UI screen 130. Here, the determination is made on the basis of the post-stage breathing correction information in the meta-information associated with the image data.

In a case where it is determined that the post-stage breathing correction is executable (Yes in step S101), the control unit 101 superimposes and displays the icon 134 on the upper right of the thumbnail image 133 in step S102.

In step S103, when the user selects the image data for which the post-stage breathing correction can be performed, the control unit 101 determines a range to be corrected in which the post-stage breathing correction is to be performed in the moving image based on the selected image data according to the user operation.

Thereafter, in step S104, the control unit 101 calculates the breathing correction amount for each frame constituting the moving image (range to be corrected). Furthermore, the control unit 101 acquires the internal breathing correction amount in the moving image (range to be corrected). Furthermore, the control unit 101 obtains the minimum value of the breathing correction amount in the moving image (range to be corrected).

Thereafter, in step S105, the control unit 101 calculates the post-stage breathing correction amount of each frame on the basis of the breathing correction amount, the minimum value, and the internal breathing correction amount.

In step S106, the control unit 101 performs the first post-stage breathing correction by the trimming correction method using the calculated post-stage breathing correction amount.

In step S107, the control unit 101 displays the moving image 138 for which the first post-stage breathing correction has been performed in the work area 135 of the UI screen 130, and causes the user to check the moving image.

In step S108, the control unit 101 determines whether or not a determination to adjust the post-stage breathing correction amount has been made according to the user operation. In a case where the determination to adjust the breathing correction amount has been made (Yes in step S108), the control unit 101 adjusts the post-stage breathing correction amount according to the user operation in step S108, for example, and moves the processing to step S105.

In step S110, the control unit 101 determines whether or not to perform the second post-stage breathing correction. As a result, in a case of performing the second post-stage breathing correction (Yes in step S110), the control unit 101 calculates the breathing correction amount for each line for each frame constituting the moving image (range to be corrected) in step S111, and then calculates the post-stage breathing correction amount for each line on the basis of the calculated breathing correction amount for each line, the minimum value, and the internal breathing correction amount.

Furthermore, in step S112, the control unit 101 performs the second post-stage breathing correction by the trimming correction method using the calculated post-stage breathing correction amount for each line.

In step S113, the control unit 101 displays the moving image 138 for which the second post-stage breathing correction has been performed in the work area 135 of the UI screen 130, and causes the user to check the moving image.

In step S114, the control unit 101 determines whether or not a determination to adjust the post-stage breathing correction amount has been made according to the user operation. In a case where the determination to adjust the breathing correction amount has been made (Yes in step S114), the control unit 101 adjusts the post-stage breathing correction amount according to the user operation in step S115, for example, and moves the processing to step S111.

Thereafter, in step S116, the control unit 101 writes out the image data for which the first post-stage breathing correction or the second post-stage breathing correction has been performed.

Note that, in the flowchart illustrated in FIG. 26, the second post-stage breathing correction is performed after the first post-stage breathing correction is performed. However, only one of the first post-stage breathing correction or the second post-stage breathing correction specified by the user or automatically selected may be performed.

4. Modification

Note that, the embodiment is not limited to the above-described specific examples, and may have configurations as various modifications.

In the above description, the imaging device 2 according to the embodiment performs the AF processing. However, the imaging device 2 may not perform the AF processing.

Furthermore, the information displayed on the UI screen 130 in the embodiment is merely an example, and other display methods may be used.

Furthermore, in the embodiment, the table information I2 (the cam curve table, the breathing correction amount table, and the focal length table in which breathing is taken into consideration) is stored in the memory 32 of the interchangeable lens 3. However, the table information 12 may be stored in the memory 62 of the imaging device 2.

Furthermore, the imaging device 2 and the computer 4 may acquire the table information 12 from the outside via a network or the like.

Furthermore, in the embodiment, the imaging device 2 is configured such that the interchangeable lens 3 is detachable. However, the imaging device 2 may be integrated with a lens. In this case, the table information 12 may be stored in the memory 62 or may be acquired from the outside via a network or the like.

5. Summary of Embodiment

As described above, the information processing device (computer 4) includes the acquisition unit (data acquisition unit F31) that acquires the meta-information regarding the breathing correction associated with the moving image, and the breathing correction unit (post-stage breathing correction unit F32) that performs the breathing correction for the moving image on the basis of the meta-information.

Thereby, the computer 4 can perform the post-stage breathing correction after imaging regardless of whether or not the real-time internal breathing correction has been performed by the imaging device 2.

Here, the imaging device 2 may not be able to perform real-time internal breathing correction depending on a frame rate of the moving image or a processing load of the internal breathing correction. Even in such a case, since the meta-information is associate with the image data, the computer 4 can perform the post-stage breathing correction.

Furthermore, in the imaging device 2, the internal breathing correction amount may be limited from the viewpoint of image deterioration. However, some users desire to perform the breathing correction without limitation. In such a case, the computer 4 can perform the post-stage breathing correction with a value larger than the limited internal breathing correction amount.

As described above, the computer 4 can improve the degree of freedom of the breathing correction.

The breathing correction unit obtains the correction amount of each frame on the basis of the meta-information, and performs the breathing correction for each frame using the obtained correction amount.

Thereby, the computer 4 only needs to obtain the post-stage breathing correction amount of each frame, and thus can reduce the processing load and perform the first post-stage breathing correction at high speed.

The breathing correction unit obtains the correction amount for each image position (line) on the basis of the meta-information for each frame constituting the moving image, and performs the breathing correction for each frame using the obtained correction amount.

For example, the computer 4 can obtain the post-stage breathing correction amount for each line, perform the second post-stage breathing correction on the basis of the post-stage breathing correction amount different for each line, and perform the high-resolution breathing correction.

The breathing correction unit obtains the exposure center of gravity for each image position in the frame, and obtains the correction amount according to the focus position at the obtained exposure center of gravity.

Thereby, the post-stage breathing correction amount for each line in each frame can be obtained using the exposure center of gravity.

The breathing correction unit performs the breathing correction for a predetermined range to be corrected in the moving image.

Thereby, the computer 4 can reduce the change in the angle of view only in a range desired by the user, such as a part of the moving image.

The breathing correction unit obtains the minimum value of the correction value in the moving image and obtains the correction amount based on the minimum value.

Thereby, the computer 4 can use the post-stage breathing correction amount by setting the minimum value of the breathing correction amount in the moving image to, for example, 1.0 times, whereby reducing the image quality deterioration.

The breathing correction unit is capable of switching between first breathing correction (first post-stage breathing correction) of performing the breathing correction with a uniform correction amount for each frame in the moving image and second breathing correction (second post-stage breathing correction) of performing the breathing correction with a different correction amount according to the image position for each frame.

Thereby, the computer 4 can perform the post-stage breathing correction in consideration of the image quality and the processing speed.

The breathing correction unit switches between the first breathing correction and the second breathing correction on the basis of the diaphragm information, the lens information, the lens identification information, the information of the imaging element 55, or the information of the focus position and the zoom position included in the meta-information.

Thereby, the computer 4 can perform the post-stage breathing correction in consideration of the image quality and the processing speed.

In a case where another breathing correction is performed for the moving image, the breathing correction unit performs the breathing correction in consideration of the another breathing correction.

Thereby, even in a case where the internal breathing correction is performed in the imaging device 2, the computer 4 can obtain the post-stage breathing correction amount in consideration of the internal breathing correction amount, and thus can perform the optimum breathing correction.

The breathing correction unit inversely converts the moving image using the correction amount of the another breathing correction, and then performs the breathing correction for the inversely converted moving image using the correction amount based on the meta-information.

Thereby, even in a case where the internal breathing correction is performed in the imaging device 2, the computer 4 can perform the breathing correction using the post-stage breathing correction amount in consideration of the internal breathing correction amount, and thus can perform the optimum breathing correction.

The breathing correction unit performs the breathing correction on the basis of the difference between the correction amount of the another breathing correction performed for the moving image and the correction amount included in the meta-information.

Thereby, even in a case where the internal breathing correction is performed in the imaging device 2, the computer 4 can perform the breathing correction using the post-stage breathing correction amount in consideration of the internal breathing correction amount, and thus can perform the optimum breathing correction.

The information processing device includes the display control unit F33 that performs display regarding the breathing correction.

Thereby, the computer 4 can show the user the correction degree of the breathing correction and the like.

The display control unit F33 displays the moving image 138 for which the breathing correction has been performed and the moving image 137 before the breathing correction is performed side by side.

Thereby, the computer 4 can enable the user to view and compare the moving image for which the breathing correction has been performed and the moving image before the breathing correction has been performed.

The display control unit F33 displays the image area (cutout frame 139) of when the breathing correction is performed on the moving image before the breathing correction is performed.

Thereby, the computer 4 can allow the user to easily grasp an image portion cut out by performing the breathing correction.

The display control unit F33 displays the information (the focal length displayed in the focal length display area 142) regarding the angle of view (focal length) of the moving image arranged in the timeline.

Thereby, the computer 4 can perform the breathing correction to adjust the focal lengths (angles of view) of the moving images arranged in the front-rear direction.

The display control unit F33 displays the executability (icon 134) of the breathing correction for the moving image.

Thereby, the computer 4 can easily grasp the executability of the breathing correction.

In a case where another breathing correction with a limitation is performed for the moving image, the display control unit F33 displays the fact of the another breathing correction with a limitation (notification frame 143).

Thereby, the computer 4 can allow the user to easily grasp that the breathing correction with a limitation has been performed.

The information processing method includes: acquiring the meta-information regarding the breathing correction associated with the moving image; and performing the breathing correction for the moving image on the basis of the meta-information.

The program for causing the information processing device to execute processing including: acquiring the meta-information regarding the breathing correction associated with the moving image; and performing the breathing correction for the moving image on the basis of the meta-information.

Such a program can be recorded in advance in an HDD as a recording medium built in a device such as a computer device, a ROM in a microcomputer having a CPU, or the like.

Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (registered trademark), a magnetic disk, a semiconductor memory, a memory card, or the like. Such a removable recording medium can be provided as so-called package software.

Furthermore, such a program may be installed from the removable recording medium into a personal computer and the like, or may be downloaded from a download site through a network such as a local area network (LAN) or the Internet.

Note that the effects described in the present description are merely examples and are not limited, and other effects may be provided.

6. Present Technology

The present technology may also adopt the following configurations.

(1)

An information processing device including:

an acquisition unit configured to acquire meta-information regarding breathing correction associated with a moving image; and a breathing correction unit configured to perform breathing correction for the moving image on the basis of the meta-information.

(2)

The information processing device according to (1), in which the breathing correction unit obtains a correction amount of each frame on the basis of the meta-information, and performs the breathing correction for each frame using the obtained correction amount.

(3)

The information processing device according to (1) or (2), in which the breathing correction unit obtains a correction amount for each image position on the basis of the meta-information for each frame constituting the moving image, and performs the breathing correction for each frame using the obtained correction amount.

(4)

The information processing device according to (3), in which the breathing correction unit obtains an exposure center of gravity for each image position in the frame, and obtains the correction amount according to a focus position at the obtained exposure center of gravity.

(5)

The information processing device according to any one of (1) or (4), in which the breathing correction unit performs the breathing correction for a predetermined range to be corrected in the moving image.

(6)

The information processing device according to any one of (1) to (5), in which the breathing correction unit obtains a minimum value of a correction value in the moving image and obtains a correction amount based on the minimum value.

(7)

The information processing device according to any one of (1) to (6), in which the breathing correction unit is capable of switching between first breathing correction of performing breathing correction with a uniform correction amount for each frame of the moving image and second breathing correction of performing breathing correction with a different correction amount according to an image position for each frame.

(8)

The information processing device according to (7), in which the breathing correction unit switches between the first breathing correction and the second breathing correction on the basis of diaphragm information, lens information, lens identification information, information of an imaging element, or information of a focus position and a zoom position included in the meta-information.

(9)

The information processing device according to any one of (1) to (8), in which, in a case where another breathing correction is performed for the moving image, the breathing correction unit performs the breathing correction in consideration of the another breathing correction.

(10)

The information processing device according to (9), in which the breathing correction unit inversely converts the moving image using a correction amount of the another breathing correction, and then performs the breathing correction for the inversely converted moving image using a correction amount based on the meta-information.

(11)

The information processing device according to (9), in which the breathing correction unit performs the breathing correction on the basis of a difference between a correction amount of the another breathing correction performed for the moving image and a correction amount included in the meta-information.

(12)

The information processing device according to any one of (1) to (11), further including:

a display control unit configured to perform display regarding the breathing correction.

(13)

The information processing device according to (12), in which the display control unit displays the moving image for which the breathing correction has been performed and the moving image before the breathing correction is performed side by side.

(14)

The information processing device according to (12) or (13), in which the display control unit displays an image area of when the breathing correction is performed, for the moving image before the breathing correction is performed.

(15)

The information processing device according to any one of (12) to (14), in which the display control unit displays information regarding an angle of view of the moving image arranged in a timeline.

(16)

The information processing device according to any one of (12) to (15), in which the display control unit displays executability of the breathing correction for the moving image.

(17)

The information processing device according to any one of (12) to (16), in which, in a case where another breathing correction with a limitation is performed for the moving image, the display control unit displays a fact of the another breathing correction with a limitation.

(18)

An information processing method including:

acquiring meta-information regarding breathing correction associated with a moving image; and performing breathing correction for the moving image on the basis of the meta-information.

(19)

A program for causing an information processing device to execute processing including:

acquiring meta-information regarding breathing correction associated with a moving image; and performing breathing correction for the moving image on the basis of the meta-information.

REFERENCE SIGNS LIST

1 Breathing correction system

2 Imaging device

3 Interchangeable lens

4 Computer

F22 Meta-information acquisition unit

F23 Internal breathing correction unit

F24 Meta-information associating unit

F31 Data acquisition unit

F32 Post-stage breathing correction unit

F33 Notification unit

The invention claimed is:

1. A non-transitory computer readable medium storing a program, the program being executable by a processor to perform operations comprising:

receiving meta-information regarding breathing correction associated with a moving image;

performing breathing correction for the moving image on a basis of the meta-information;

obtaining a correction amount for each of a plurality of image positions on a basis of the meta-information for each frame constituting the moving image; and performing the breathing correction for each frame using the obtained correction amount.

2. The non-transitory computer readable medium according to claim 1, wherein the operations further comprise:

obtaining a correction amount of each frame on a basis of the meta-information, and performing the breathing correction for each frame using the obtained correction amount.

3. The non-transitory computer readable medium according to claim 1, wherein the operations further comprise:

obtaining an exposure center of gravity corresponding to the plurality of image positions, and obtaining the correction amount according to a focus position at the obtained exposure center of gravity.

4. The non-transitory computer readable medium according to claim 1, wherein the operations further comprise:

performing the breathing correction for a predetermined range to be corrected in the moving image.

5. The non-transitory computer readable medium according to claim 1, wherein; the operations further comprise:

in a case where another breathing correction is performed for the moving image performing the breathing correction in consideration of the another breathing correction.

6. The non-transitory computer readable medium according to claim 5, wherein the operations further comprise:

inversely converting the moving image using a correction amount of the another breathing correction; and performing the breathing correction for the inversely converted moving image using a correction amount based on the meta-information.

7. The non-transitory computer readable medium according to claim 1, wherein the operations further comprise:

causing a display display regarding the breathing correction.

8. The non-transitory computer readable medium according to claim 7, wherein the operations further comprise:

causing a side-by-side display of the moving image for which the breathing correction has been performed and the moving image before the breathing correction is performed.

9. The non-transitory computer readable medium according to claim 7, wherein the operations further comprise:

causing a display of an image area of when the breathing correction is performed, for the moving image before the breathing correction is performed.

10. A non-transitory computer readable medium storing a program, the program being executable to perform operations comprising:

receiving meta-information regarding breathing correction associated with a moving image;

performing breathing correction for the moving image on a basis of the meta-information;

obtaining a minimum value of a correction value in the moving image; and obtaining a correction amount based on the minimum value.

11. A non-transitory computer readable medium storing a program, the program being executable to perform operations comprising:

receiving meta-information regarding breathing correction associated with a moving image;

performing breathing correction for the moving image on a basis of the meta-information; and switching between first breathing correction of performing breathing correction with a uniform correction amount for each frame of the moving image and second breathing correction of performing breathing correction with a different correction amount according to an image position for each frame.

12. The non-transitory computer readable medium according to claim 11, wherein the operations further comprise:

switching between the first breathing correction and the second breathing correction on a basis of at least one of diaphragm information, lens information, lens identification information, information of an imaging element, or information of a focus position and a zoom position included in the meta-information.

13. A non-transitory computer readable medium storing a program, the program being executable to perform operations comprising:

receiving meta-information regarding breathing correction associated with a moving image;

performing breathing correction for the moving image on a basis of the meta-information; and in a case where another breathing correction is performed for the moving image, performing the breathing correction in consideration of the another breathing correction; and performing the breathing correction on a basis of a difference between a correction amount of the another breathing correction performed for the moving image and a correction amount included in the meta-information.

14. A non-transitory computer readable medium storing a program, the program being executable to perform operations comprising:

receiving meta-information regarding breathing correction associated with a moving image;

performing breathing correction for the moving image on a basis of the meta-information;

causing a display regarding the breathing correction; and causing a display of information regarding an angle of view of the moving image arranged in a timeline.

15. A non-transitory computer readable medium storing a program, the program being executable to perform operations comprising:

receiving meta-information regarding breathing correction associated with a moving image;

performing breathing correction for the moving image on a basis of the meta-information;

causing a display regarding the breathing correction; and causing a display of executability of the breathing correction for the moving image.

16. A non-transitory computer readable medium storing a program, the program being executable to perform operations comprising:

receiving meta-information regarding breathing correction associated with a moving image;

performing breathing correction for the moving image on a basis of the meta-information;

causing a display regarding the breathing correction; and in a case where another breathing correction with a limitation is performed for the moving image, causing a display of a fact of the another breathing correction with a limitation.

17. An information processing method comprising:

receiving meta-information regarding breathing correction associated with a moving image;

performing breathing correction for the moving image on a basis of the meta-information;

obtaining a correction amount for each of a plurality of image positions on a basis of the meta-information for each frame constituting the moving image; and performing the breathing correction for each frame using the obtained correction amount.

18. The information processing method according to claim 17, further comprising:

obtaining a correction amount of each frame on a basis of the meta-information, and performing the breathing correction for each frame using the obtained correction amount.

19. The information processing method according to claim 17, further comprising:

obtaining an exposure center of gravity corresponding to the plurality of image positions, and obtaining the correction amount according to a focus position at the obtained exposure center of gravity.

20. The information processing method according to claim 17, further comprising:

performing the breathing correction for a predetermined range to be corrected in the moving image.

21. The information processing method according to claim 17, further comprising:

in a case where another breathing correction is performed for the moving image, performing the breathing correction in consideration of the another breathing correction.

22. The information processing method according to claim 21, further comprising:

inversely converting the moving image using a correction amount of the another breathing correction; and performing the breathing correction for the inversely converted moving image using a correction amount based on the meta-information.

23. The information processing method according to claim 17, further comprising:

causing a display regarding the breathing correction.

24. The information processing method according to claim 23, further comprising:

causing a side-by-side display of the moving image for which the breathing correction has been performed and the moving image before the breathing correction is performed.

25. The information processing method according to claim 23, further comprising:

causing a display of an image area of when the breathing correction is performed, for the moving image before the breathing correction is performed.

26. An information processing method comprising:

receiving meta-information regarding breathing correction associated with a moving image;

performing breathing correction for the moving image on a basis of the meta-information;

obtaining a minimum value of a correction value in the moving image; and obtaining a correction amount based on the minimum value.

27. An information processing method comprising:

receiving meta-information regarding breathing correction associated with a moving image;

performing breathing correction for the moving image on a basis of the meta-information; and switching between first breathing correction of performing breathing correction with a uniform correction amount for each frame of the moving image and second breathing correction of performing breathing correction with a different correction amount according to an image position for each frame.

28. The information processing method according to claim 27, further comprising:

switching between the first breathing correction and the second breathing correction on a basis of at least one of diaphragm information, lens information, lens identification information, information of an imaging element, or information of a focus position and a zoom position included in the meta-information.

29. An information processing method comprising:

receiving meta-information regarding breathing correction associated with a moving image;

performing breathing correction for the moving image on a basis of the meta-information;

in a case where another breathing correction is performed for the moving image, performing the breathing correction in consideration of the another breathing correction; and performing the breathing correction on a basis of a difference between a correction amount of the another breathing correction performed for the moving image and a correction amount included in the meta-information.

30. An information processing method comprising:

receiving meta-information regarding breathing correction associated with a moving image;

performing breathing correction for the moving image on a basis of the meta-information;

causing a display regarding the breathing correction; and causing a display of information regarding an angle of view of the moving image arranged in a timeline.

31. An information processing method comprising:

receiving meta-information regarding breathing correction associated with a moving image;

performing breathing correction for the moving image on a basis of the meta-information;

causing a display regarding the breathing correction; and causing a display of executability of the breathing correction for the moving image.

32. An information processing method comprising:

receiving meta-information regarding breathing correction associated with a moving image;

performing breathing correction for the moving image on a basis of the meta-information;

causing a display regarding the breathing correction; and in a case where another breathing correction with a limitation is performed for the moving image, causing a display of a fact of the another breathing correction with a limitation.

\* \* \* \* \*